United States Patent
Khan et al.

(10) Patent No.: US 10,989,787 B2
(45) Date of Patent: Apr. 27, 2021

(54) SUPPORTING A POSITIONING OF A MOBILE DEVICE BY THE MOBILE DEVICE

(71) Applicant: HERE GLOBAL B.V., Eindhoven (NL)

(72) Inventors: Muhammad Irshan Khan, Tampere (FI); Jari Syrjärinne, Tampere (FI); Pavel Ivanov, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 538 days.

(21) Appl. No.: 15/738,481

(22) PCT Filed: Jun. 29, 2015

(86) PCT No.: PCT/EP2015/064635
§ 371 (c)(1),
(2) Date: Dec. 20, 2017

(87) PCT Pub. No.: WO2017/000979
PCT Pub. Date: Jan. 5, 2017

(65) Prior Publication Data
US 2018/0180704 A1    Jun. 28, 2018

(51) Int. Cl.
*G01S 5/02*    (2010.01)
(52) U.S. Cl.
CPC .......... *G01S 5/0252* (2013.01); *G01S 5/0236* (2013.01)
(58) Field of Classification Search
CPC ................ G01S 5/0236; G01S 5/0252–02529
See application file for complete search history.

(56) References Cited

U.S. PATENT DOCUMENTS

| 2002/0178471 | A1 | 11/2002 | Plaisted et al. |
| 2007/0024498 | A1* | 2/2007 | Korneluk ............ G01S 5/0072 342/357.42 |

(Continued)

FOREIGN PATENT DOCUMENTS

| CN | 102687141 A | 9/2012 |
| CN | 103155662 A | 6/2013 |

(Continued)

OTHER PUBLICATIONS

H.K. Fard et al., Indoor Positioning of Mobile Devices with Agile iBeacon Deployment, Proceeding of the IEEE 28th Canadian Conference on Electrical and Computer Engineering, p. 275-279, May 2015 (Year: 2015).*

(Continued)

*Primary Examiner* — Bernarr E Gregory
*Assistant Examiner* — Fred H Mull
(74) *Attorney, Agent, or Firm* — Alston & Bird LLP

(57) ABSTRACT

A positioning support device holds available stored data which enables a determination of characteristics of radio signals transmitted by the positioning support device, wherein the characteristics of radio signals are expected to be observable at different locations. The positioning support device automatically and repeatedly transmits the stored data. Mobile devices may receive the data to estimate their position based on the data and based on measurements on radio signals received at their current location. The positioning support device may be caused by some other apparatus to store the data that is transmitted by the positioning support device. The data may be obtained based on characteristics of radio signals observed by at least one mobile device at each of a plurality of measurement locations.

25 Claims, 12 Drawing Sheets

(56) References Cited

U.S. PATENT DOCUMENTS

| | | |
|---|---|---|
| 2011/0234399 A1 | 9/2011 | Yan |
| 2012/0016626 A1 | 1/2012 | Laine et al. |
| 2012/0258669 A1 | 10/2012 | Honkanen et al. |
| 2012/0302261 A1* | 11/2012 | Tinnakornsrisuphap ................ G01S 5/0252 455/456.4 |
| 2013/0150073 A1 | 6/2013 | Jovicic et al. |
| 2014/0087752 A1 | 3/2014 | Zhu et al. |
| 2014/0171100 A1 | 6/2014 | Marti et al. |
| 2014/0194137 A1 | 7/2014 | Do et al. |
| 2015/0133167 A1* | 5/2015 | Edge .................. G01S 5/0252 455/456.3 |
| 2015/0212191 A1* | 7/2015 | Zhang .................. G01S 5/0236 342/450 |
| 2016/0161592 A1 | 6/2016 | Wirola et al. |
| 2016/0189416 A1* | 6/2016 | Naguib ................. G01S 5/0252 345/441 |
| 2016/0330584 A1* | 11/2016 | Akpinar ............... G01S 5/0252 |
| 2018/0136308 A1 | 5/2018 | Wirola et al. |

FOREIGN PATENT DOCUMENTS

| | | |
|---|---|---|
| CN | 103502835 A | 1/2014 |
| CN | 103649770 A | 3/2014 |
| CN | 103650542 A | 3/2014 |
| GB | 2517488 A | 8/2013 |
| WO | WO-2014/068366 A1 | 5/2014 |
| WO | WO-2014/108757 A1 | 7/2014 |
| WO | WO-2014/144760 A1 | 9/2014 |
| WO | WO-2015/024758 A1 | 2/2015 |
| WO | WO-2016/180480 A1 | 11/2016 |

OTHER PUBLICATIONS

International Search Report and Written Opinion of International Searching Authority for International Patent Application No. PCT/EP2015/064635 dated Mar. 23, 2016, 13 pages.

International Preliminary Report on Patentability (Chapter I) for International Patent Application No. PCT/EP2015/064635 dated Jan. 2, 2018, 10 pages.

"Specification of the Bluetooth System, Covered Core Package version: 4.2" Bluetooth SIG, Dec. 2, 2014, 12 pages.

Peterson, Larry et al., "Computer Networks", Second Addition, Morgan Kaufmann Publishers, dated (Jun. 2001).

Office Action for Chinese Application No. 201580081358.4 dated Aug. 5, 2020.

\* cited by examiner

| 0 | 0 | 51 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 23 | 0 | 0 | 0 | 0 | 0 | 0 | 0 | 0 | 0 | 0 | 0 | 0 | 0 | 0 |
| -58 | 0 | 30 | 0 | 0 | 0 | 0 | 0 | 0 | 0 | 0 | 0 | 0 | 0 | 0 | 0 |
| 0 | 20 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

FIG. 15

SUPPORTING A POSITIONING OF A MOBILE DEVICE BY THE MOBILE DEVICE

FIELD OF THE DISCLOSURE

The invention relates to the field of positioning and more specifically to supporting a positioning of a mobile device by the mobile device itself.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BLE) based positioning solutions, cellular network based positioning solutions and wireless local area network (WLAN) based positioning solutions.

A WLAN based positioning solution, for instance, may be divided in two stages, a training stage and a positioning stage.

In the training stage, learning data is collected. The data may be collected in the form of fingerprints that are based on measurements by mobile devices. A fingerprint may contain a location estimate and measurements taken from the radio interface. The location estimate may be for example GNSS based, sensor-based, or manually inputted. Measurements taken from the radio interface may comprise, by way of example, measured radio signal strengths and an identification of WLAN access points transmitting the radio signals. The training may be a continuous background process, in which mobile devices of a large number of consumers are continuously reporting measured data to a server. Consumers may consent to a participation in such a data collection, if their device is equipped with the needed functionality. This approach is also referred to as crowd-sourcing. Alternatively or in addition, mobile devices may be used for collecting fingerprints in a systematic manner. Collected fingerprint data may be uploaded to a database in a server or in the cloud, where algorithms may be run to generate radio models of WLAN access points and/or radio maps for positioning purposes.

In the positioning stage, a mobile device may estimate its current location based on own measurements taken from the radio interface and on the data or a subset of data that is available from the training stage. Model data or radio map data that has been generated in the training stage may be transferred to mobile devices by a server via the Internet as assistance data for use in position determinations. Alternatively, model data and/or radio map data may be stored in a positioning server to which the mobile devices may connect to via the Internet for obtaining a position estimate.

A similar approach could be used for a positioning that is based on other types of terrestrial transmitters or on a combination of different types of terrestrial transmitters.

SUMMARY OF SOME EMBODIMENTS OF THE INVENTION

For a first aspect of the invention, an example embodiment of a method comprises holding available, at a positioning support device, stored data which enables a determination of characteristics of radio signals transmitted by the positioning support device, wherein the characteristics of radio signals are expected to be observable at different locations. The method further comprises automatically and repeatedly transmitting, by the positioning support device, the stored data to enable mobile devices receiving the data to determine their position based on the data.

For a second aspect of the invention, an example embodiment of a method comprises, performed by at least one apparatus, obtaining characteristics of radio signals, the radio signals transmitted by a plurality of positioning support devices and the characteristics of radio signals measured by at least one mobile device at each of a plurality of locations. The method further comprises obtaining identifications of the positioning support devices and obtaining indications of the locations of measurement. The method further comprises assembling based on the obtained characteristics of radio signals, the obtained identifications of the positioning support devices and the obtained indications of the locations of measurement separately for each of the positioning support devices data which enables a determination of characteristics of radio signals transmitted by the respective positioning support device, wherein the characteristics of radio signals are expected to be observable at different locations. The method further comprises causing each of the plurality of positioning support devices to store the data assembled for the respective positioning support device as a basis for a repeated and automatic transmission of the data by the respective positioning support device to enable mobile devices receiving the data from at least one of the plurality of positioning support devices to determine their positions.

For a third aspect of the invention, an example embodiment of a method comprises, performed by at least one apparatus, obtaining at least one characteristic of at least one radio signal, the at least one radio signal transmitted by at least one positioning support device and the at least one characteristic of the at least one radio signal measured by a mobile device at a particular location, and obtaining an identification of the at least one positioning support device. The method further comprises extracting from the radio signals transmitted by each of the at least one positioning support device data which enables a determination of characteristics of radio signals transmitted by the respective positioning support device that are expected to be observable at different locations. The method further comprises estimating a position of the mobile device by matching the at least one measured characteristic of the at least one radio signal with the data which enables a determination of characteristics of signals that are expected to be observable at different locations.

An example embodiment of a first apparatus for each aspect of the invention comprises means for performing the actions of any embodiment of the example method presented for the first aspect or the second aspect or the third aspect.

The means of the first apparatus for each aspect of the invention may be implemented in hardware and/or software. They may comprise for instance a processor for executing computer program code for realizing the required functions, a memory storing the program code, or both. Alternatively, they may comprise for instance a circuit that is designed to realize the required functions, for instance implemented in a chipset or a chip, like an integrated circuit. For the first aspect, the means may comprise in addition a memory storing data.

An example embodiment of a second apparatus for the first aspect of the invention comprises at least one processor and at least one memory. The at least one memory includes computer program code and data which enables a determination of characteristics of radio signals transmitted by a positioning support device, wherein the characteristics of radio signals are expected to be observable at different locations. The at least one memory and the computer program code are configured to, with the at least one processor, cause the apparatus at least to perform the actions of any embodiment of the example method presented for the first aspect.

An example embodiment of a second apparatus for the second aspect or the third aspect of the invention comprises at least one processor and at least one memory including computer program code, the at least one memory and the computer program code configured to, with the at least one processor, cause the apparatus at least to perform the actions of any embodiment of the example method presented for the second aspect or the third aspect.

Any of the described apparatuses may comprise only the indicated components or one or more additional components.

Moreover an example embodiment of a system is presented, which comprises a plurality of any presented example embodiment of any apparatus of the first aspect. Optionally, the system may comprise in addition any presented example embodiment of any apparatus of the second aspect and/or any presented example embodiment of any apparatus of the third aspect.

Moreover an example embodiment of a non-transitory computer readable storage medium, in which computer program code is stored, is presented for the second and third aspect of the invention. The computer program code causes an apparatus to perform the actions of any embodiment of the example method presented for the second aspect or the third aspect when executed by a processor.

The computer readable storage medium may be for example a disk or a memory or the like. The computer program code may be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that any embodiment of the computer program code by itself has to be considered an example embodiment of the invention according to the second aspect or the third aspect, respectively, as well. The computer program code could also be distributed to several computer readable storage mediums.

In certain embodiments, any of the presented methods is an information providing method, and any of the presented first apparatuses is an information providing apparatus. In certain embodiments, the means of the presented first apparatus are processing means.

In certain embodiments, any of the presented methods is a method for supporting a positioning of a mobile device by the mobile device. In certain embodiment, any of the presented apparatuses is an apparatus for supporting a positioning of a mobile device by the mobile device.

It is to be understood that any feature presented for a particular example embodiment may also be used in combination with any other described example embodiment of any category and any aspect.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 15 illustrates the determination of zigzag offsets with each offset representing the number of zero elements between the previous and the current AC component.

DETAILED DESCRIPTION OF THE FIGURES

Figure 1:
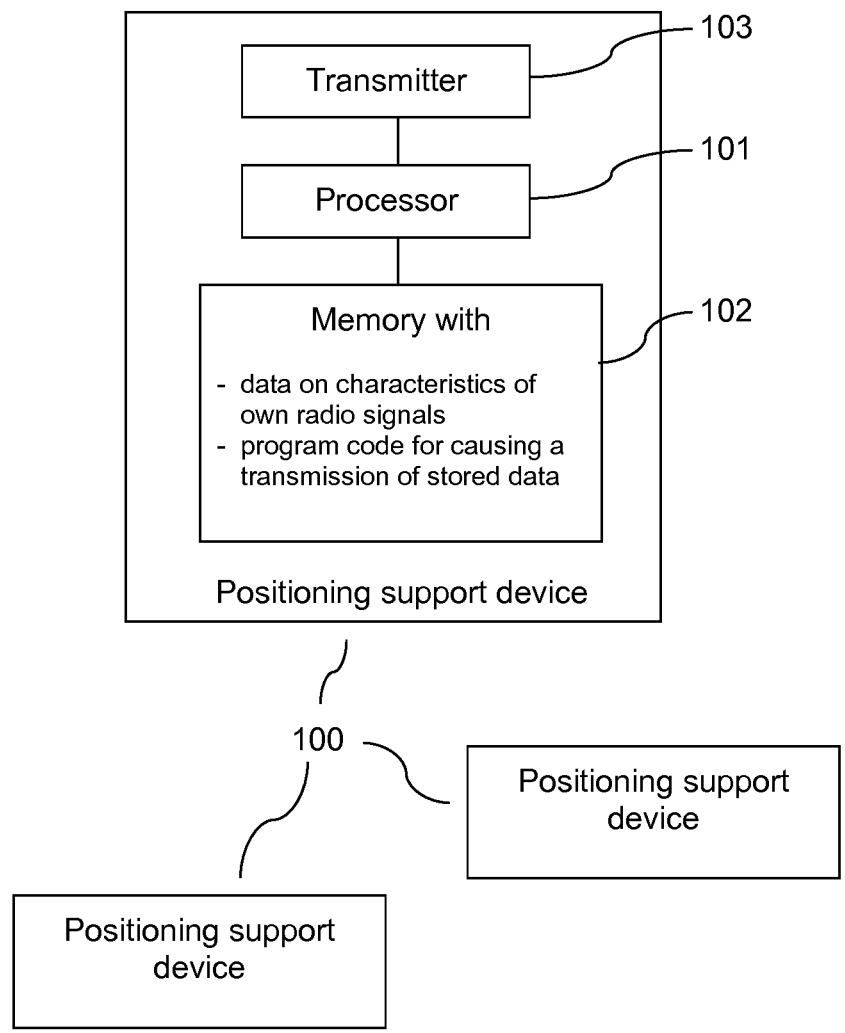
FIG. 1 is a schematic block diagram of an example embodiment of a system comprising an example embodiment of an apparatus according to the first aspect.

FIG. 1 is a schematic block diagram of an example embodiment of a system according to the invention. The system comprises a plurality of positioning support devices 100. Each positioning support device 100 is an example embodiment of an apparatus according to the first aspect of the invention. Each positioning support device comprises a processor 101 and, linked to processor 101, a memory 102 and a transmitter 103. Memory 102 stores data which enables a determination of characteristics of radio signals that are transmitted via transmitter 103 and computer program code for causing a transmission of the stored data. It is to be understood that data and program code may also be distributed to a plurality of memories 102 of positioning support device 100. Processor 101 is configured to execute computer program code stored in memory 102 in order to cause positioning support device 100 to perform desired actions.

Each of the positioning support devices 100 may be a stationary device. A stationary device is configured to be stationary when in operation and/or fixed to a particular location. A stationary device may be ground based and thus stationary with respect to Earth or only stationary within a particular environment, like a ship. Any of positioning support devices 100 may equally be a module, like a chip or circuitry on a chip, for a stationary device. Optionally, any of the positioning support devices 100 may comprise various other components, like a data interface, a user interface, a further memory, a further processor, etc.

An example operation of the system of FIG. 1 will now be described with reference to the flow chart of FIG. 2. The operation is an example embodiment of a method according to the first aspect of the invention.

Positioning support device 100 holds available stored data, which enables a determination of characteristics of radio signals transmitted by the positioning support device, wherein the characteristics of radio signals are expected to be observable at different locations. (action 111)

Positioning support device 100 furthermore automatically and repeatedly transmits the stored data to enable mobile devices receiving the data to determine their position based on the data. (action 112) Processor 101 and the program code stored in memory 102 of positioning support device 100 may cause the positioning support device 100 to perform this action when program code is retrieved from memory 102 and executed by processor 101. The stored data may be transmitted via transmitter 103. Transmitting stored data automatically may be understood such that the data is transmitted autonomously by the positioning support device 100, that is, without trigger by an external server for each of the repeated transmissions.

The same actions may be performed by each of the plurality of positioning support devices 100 of the system of FIG. 1 to enable mobile devices to determine their own positions more precisely and at various locations.

Figure 3:
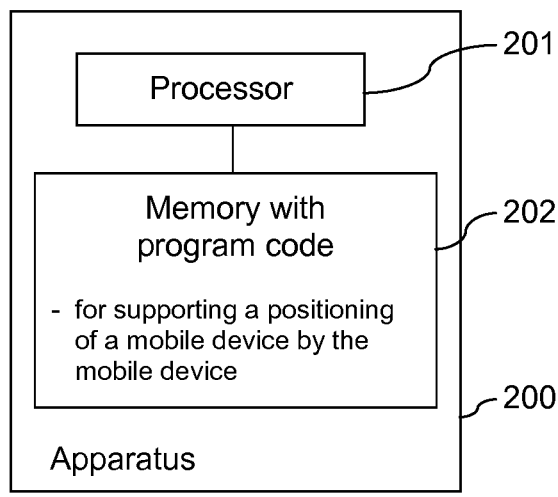
FIG. 3 is a schematic block diagram of an example embodiment of an apparatus according to the second and/or third aspect.

FIG. 3 is a schematic block diagram of an example embodiment of an apparatus 200 according to the second or third aspect of the invention. Apparatus 200 comprises a processor 201 and, linked to processor 201, a memory 202. Memory 202 stores computer program code for supporting a positioning of a mobile device by the mobile device in line with the second and third aspect of the invention, respectively. Processor 201 is configured to execute computer program code stored in memory 202 in order to cause an apparatus to perform desired actions.

For the second aspect, apparatus 200 may be a mobile device, like a mobile communication device, or a stationary device, like a server. A mobile device is configured to enable operation while the device is moving. For the third aspect, apparatus 200 may be a mobile device, like a mobile communication device or an Internet-of-Things (IoT) device. Apparatus 200 may equally be a module, like a chip, circuitry on a chip or a plug-in board, for a device. Optionally, apparatus 200 may comprise various other components, like a data interface, a user interface, a further memory, a further processor, etc.

An example operation of apparatus 200 will now be described with reference to the flow chart of FIG. 4. The operation is an example embodiment of a method according to the second aspect of the invention. Processor 201 and the program code stored in memory 202 cause an apparatus to perform the operation when program code according to the second aspect of the invention is retrieved from memory 202 and executed by processor 201. The apparatus that is caused to perform the operation may be apparatus 200 or some other apparatus, for example but not necessarily a device comprising apparatus 200.

The apparatus obtains characteristics of radio signals. The radio signals are radio signals transmitted by a plurality of positioning support devices, and the characteristics of radio signals are characteristics measured by at least one mobile device at each of a plurality of locations. The apparatus moreover obtains identifications of the positioning support devices and indications of the locations of measurement. (action 211)

The apparatus furthermore assembles based on the obtained characteristics of radio signals, the obtained identifications of the positioning support devices and the obtained indications of the locations of measurement separately for each of the positioning support devices data which enables a determination of characteristics of radio signals transmitted by the respective positioning support device, wherein the characteristics of radio signals are expected to be observable at different locations. (action 212)

The apparatus furthermore causes each of the plurality of positioning support devices to store the data assembled for the respective positioning support device as a basis for a repeated and automatic transmission of the data by the respective positioning support device to enable mobile devices receiving the data from at least one of the plurality of positioning support devices to determine their positions. (action 213)

Another example operation of apparatus 100 will now be described with reference to the flow chart of FIG. 5. The operation is an example embodiment of a method according to the third aspect of the invention. Processor 101 and the program code stored in memory 102 cause an apparatus to perform the operation when program code according to the third aspect of the invention is retrieved from memory 102 and executed by processor 101. The apparatus that is caused to perform the operation may be apparatus 100 or some other apparatus, for example but not necessarily a device comprising apparatus 100.

The apparatus obtains at least one characteristic of at least one radio signal, the at least one radio signal transmitted by at least one positioning support device and the at least one characteristic of the at least one radio signal measured by a mobile device at a particular location. The apparatus moreover obtains an identification of the at least one positioning support device. (action 221)

The apparatus furthermore extracts from the radio signals transmitted by each of the at least one positioning support device data which enables a determination of characteristics of radio signals transmitted by the respective positioning support device that are expected to be observable at different locations. (action 222)

The apparatus furthermore estimates a position of the mobile device by matching the at least one measured characteristic of the at least one radio signal with the data which enables a determination of characteristics of signals that are expected to be observable at different locations. (action 223)

It is to be understood that in some example embodiments, apparatus 200 of FIG. 3 may be an apparatus according to the second and third aspect of the invention and thus be configured to support an embodiment of the method according to the second aspect of the invention and as well an embodiment of the method according to the third aspect of the invention.

Conventional systems that enable a mobile device to determine its own position based on location dependent characteristics of radio signals of different transmitters require an Internet connection to download data on the characteristics of radio signals from the backend of a service provider. Some mobile devices may not be equipped with a cell modem or a WLAN modem that would enable them to access the Internet, though. A manual transfer of the data using a wired link instead may be troublesome and limited to few locations. Also for mobile devices that are principally able to wirelessly access the Internet, availability of the Internet may not be given whenever the data is be needed. Furthermore, some devices may have a very small memory that is unable to store a large amount of positioning assistance data, like data for an entire region or data for an entire building. Such devices may include IoT devices, like smart watches, smart bands, etc.

Certain embodiments of the first aspect of the invention therefore provide that a positioning support device is enabled to transmit information defining an association of observable characteristics of its own radio signals with different locations. Such an association may be considered a radio image. A plurality of such positioning support devices may be distributed at a certain site. A mobile device may then be enabled to perform measurements on radio signals at its current location at the site to obtain characteristics of radio signals transmitted by one or more positioning support devices and furthermore to receive from each of these one or more positioning support devices information defining the radio image that is generated by the radio signals of the respective positioning support device. Certain embodiments of the third aspect of the invention provide that an apparatus estimates the position of such a mobile device based on obtained characteristics of radio signals from the at least one positioning support device and on the received information defining a radio image for the at least one positioning support device. Certain embodiments of the second aspect of the invention provide that information defining a radio image is assembled separately for of each of the plurality of positioning support devices. The assembled information defining a radio image may then be caused to be stored specifically in the positioning support device which transmits the signals generating the radio image.

Certain embodiments of the invention may have the effect that they enable mobile devices to determine their own position based on detected radio signals and on data which enables a determination of expected characteristics of radio signals at different locations. Certain embodiments of the invention may have the effect that they contribute to a self-contained positioning system that does not require an Internet connection or a wired connection to a server of a positioning provider to download the required data to such mobile devices. Certain embodiments of the invention may have the effect that they enable mobile devices with very small memory to determine their own position using such data, since the mobile devices will only need to store data for positioning support devices that may be observed at their current location. The number of positioning support devices for which data has to be stored at the same time at a mobile device may thus be quite small compared to the entire data for positioning support devices of a whole site, like a whole building or a whole floor of a building.

Figure 2:
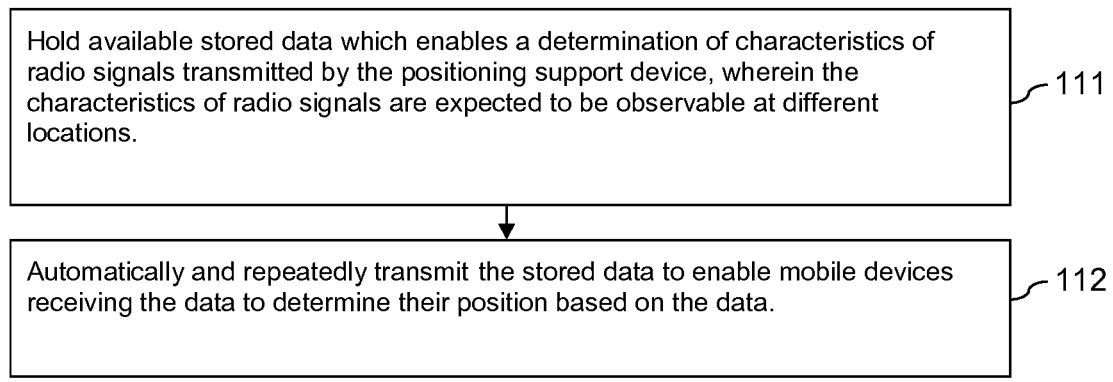
FIG. 2 is a flow chart illustrating an example embodiment of a method according to the first aspect.
Figure 4:
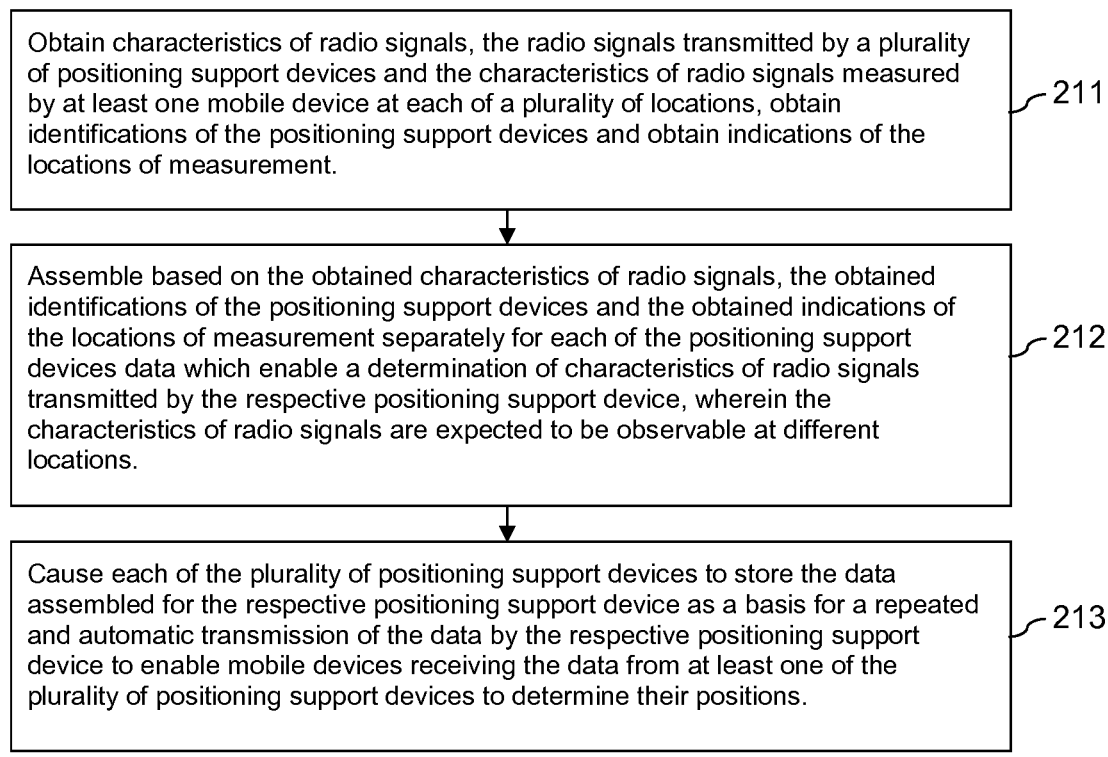
FIG. 4 is a flow chart illustrating an example embodiment of a method according to the second aspect.
Figure 5:
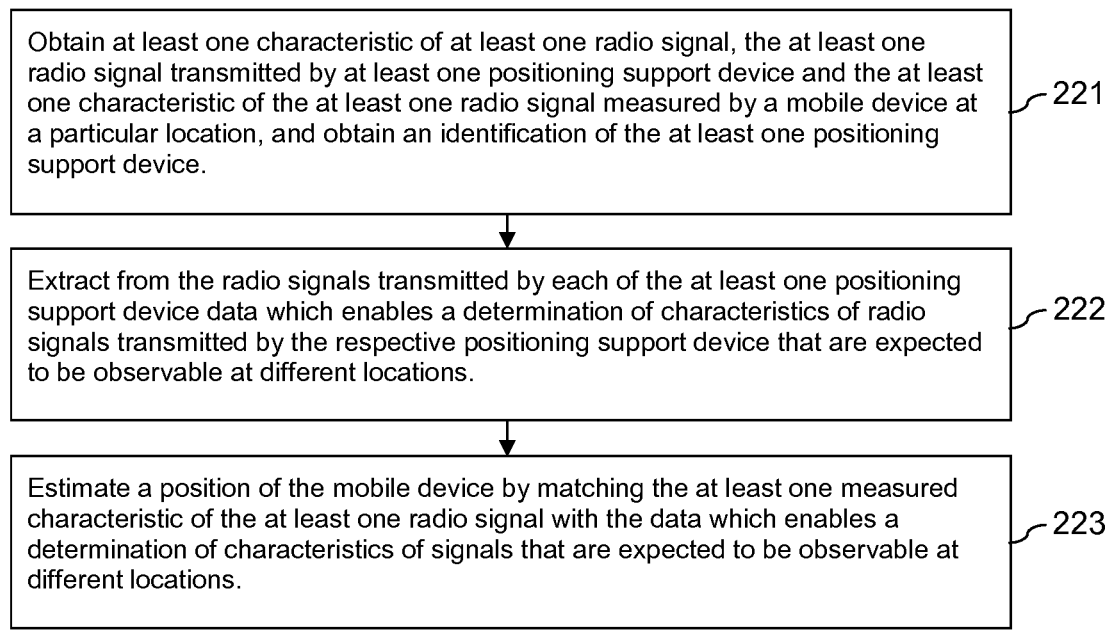
FIG. 5 is a flow chart illustrating an example embodiment of a method according to the third aspect.

Apparatus 100 illustrated in FIG. 1, apparatus 200 illustrated in FIG. 3 and the methods illustrated in FIGS. 2, 4 and 5 may be implemented and refined in various ways.

In order to be able to transmit data, the positioning support device may comprise any kind of terrestrial transmitter, in particular, though not exclusively, any kind of non-cellular terrestrial transmitter.

In an example embodiment of either aspect, a positioning support device is or comprises at least one of a Bluetooth beacon, a Bluetooth beacon enabling Bluetooth low energy mode, and a Bluetooth low energy beacon. Bluetooth beacons are already installed in many buildings. Furthermore, Bluetooth technologies are supported by many mobile user devices by default, like by most smartphones, tablets, laptops and feature phones. Using Bluetooth beacons and/or BLE beacons as positioning support devices may thus have the effect that the supported positioning may be based in some embodiments on an existing infrastructure in buildings and/or on existing capabilities in many mobile devices. As a result, the approach may be globally scalable and have low maintenance and deployment costs. The deployment of new infrastructure, including for example beacons and tags, is possible but not necessary. In addition, the end-user experience may be acceptable with these technologies, since a horizontal positioning accuracy of 2-3 meters as well as close to 100% reliability in floor detection may be achieved. The beacons may be stand-alone devices or be integrated into or attached to some other device. The use of Bluetooth low energy may enable a positioning with limited energy consumption at all involved devices.

A Bluetooth beacon that is employed for the invention may be any kind of Bluetooth beacon complying with any present or future standard. It is to be understood, however, that other types of positioning support devices than variations of Bluetooth beacons may be used as well, for instance tags or other devices that are configured to transmit ultra-wideband (UWB) signals or ultra-sound signals or any wireless signals that might emerge in the future.

In example embodiments of either aspect, the data enabling a determination of characteristics of radio signals is transmitted in a broadcast and/or as advertising data and/or as advertising data in at least one air interface packet and/or using at least one advertising channel and/or using at least one advertising channel that is provided for broadcasts. Each of these embodiments may have the effect that a mobile device that is to be positioned does not have to be enabled to open a communication channel and that the positioning may thus be accelerated. This may further have the effect that the data that is transmitted in a single broadcast may be used by many mobile devices. This may save bandwidth as well as energy at the positioning support device. Advertising data is furthermore widely used for discovery of radio transmitters, which may enable a convenient adaptation of existing approaches for transmitting conventional advertising data for transmitting the data stored in a positioning support device according to the invention.

In an example embodiment of the first aspect, the characteristics of radio signals that are expected to be observable at different locations comprise values relating to received signal strengths of radio signals. Accordingly, in an example embodiment of the second aspect, the observed characteristics of radio signals observed by at least one mobile device at a plurality of locations comprise values relating to received signal strengths of radio signals from a respective positioning support device observed at different locations. Further accordingly, in an example embodiment of the third aspect, the characteristics of radio signals observed by a mobile device at a particular location comprise a value relating to a received signal strength of a signal from the at least one positioning support device. Using received signal strength related values as characteristics of radio signals may have the effect that such values may be determined for any kind of transmitter. It may further have the effect that they may be measured at a receiving end without establishing any connection with the transmitting end. A value relating to a received signal strength of a radio signal may be for instance a received signal strength indication RSSI or a physical Rx level in dBm with a reference value of 1 mW, etc. Another kind of value relating to a received signal strength of a radio signal may be for instance an indication of a path loss of a radio signal at a particular location. Other possible characteristics may comprise a timing advance (TA) value or a round-trip time value.

In an example embodiment of the first and third aspect, the data enabling a determination of characteristics of radio signals transmitted by a respective positioning support device comprises data of a radio model for radio signals transmitted by the positioning support device. Accordingly, an example embodiment of the second aspect comprises assembling such data. The radio model may be of any feasible kind and in any original, encoded, compressed or otherwise processed form, of which a few examples are presented in the following.

In an example embodiment of the first and third aspect, the data enabling a determination of characteristics of radio signals transmitted by a respective positioning support device comprises data of a grid based radio image. Accordingly, an example embodiment of the second aspect comprises assembling such data. A grid based radio image may be given for instance by a set of characteristics of radio signals with each characteristic assigned to a respective grid point of a grid which is defined to correspond to a certain geographical area. A respective characteristic may be assigned to all or selected grid points of the grid. Using grid based radio image data may have the effect that the data may reflect details of the real radio environment particularly well. The data of such a grid based radio image may be compressed data or non-compressed data. If the data is compressed, an example embodiment of the third aspect may further comprise decompressing the data of the grid based radio image. Compressed data may comprise selected frequency coefficients of frequency transformed data of the grid based radio image. Such selected frequency coefficients may or may not be further compressed, for instance using any kind of lossless compression technique. If the selected frequency coefficients are compressed, an example embodiment of the third aspect may further comprise decompressing the selected frequency coefficients, before an inverse frequency transform is applied to the decompressed selected frequency coefficients to recover data of the grid based radio image. Corresponding example embodiments of the second aspect may comprise compressing data of a grid based radio image, including for example applying a frequency transform to grid based radio image data and/or selecting frequency coefficients of frequency transformed data and/or compressing selected frequency coefficients of frequency transformed data. Using compressed grid based radio image data may have the effect that the required amount of data that is needed for reflecting the radio image may be reduced significantly. Using selected frequency coefficients as compressed data may have the effect that a reconstructed radio image may be fairly similar to the original radio image.

In an example embodiment of the first and third aspect, the data enabling a determination of characteristics of radio signals transmitted by a respective positioning support device comprises parameter values of a parametric radio model for radio signals transmitted by the positioning support device. Accordingly, an example embodiment of the second aspect comprises computing such parameter values for a respective positioning support device. Using parameter values of a parametric radio model may have the effect that the required amount of data for defining the characteristics of radio signals may be particularly small. An example of a parametric radio model is a path loss model for radio signals transmitted by a positioning support device. In this case, the parameters may comprise a location of the positioning support device, a path loss exponent and an indication of a transmission power used by the positioning support device.

In an example embodiment of the third aspect, a storage of data is caused, wherein the data is based on the obtained data enabling a determination of characteristics of radio signals transmitted by a positioning support device that are expected to be observable at different locations.

Figure 6:
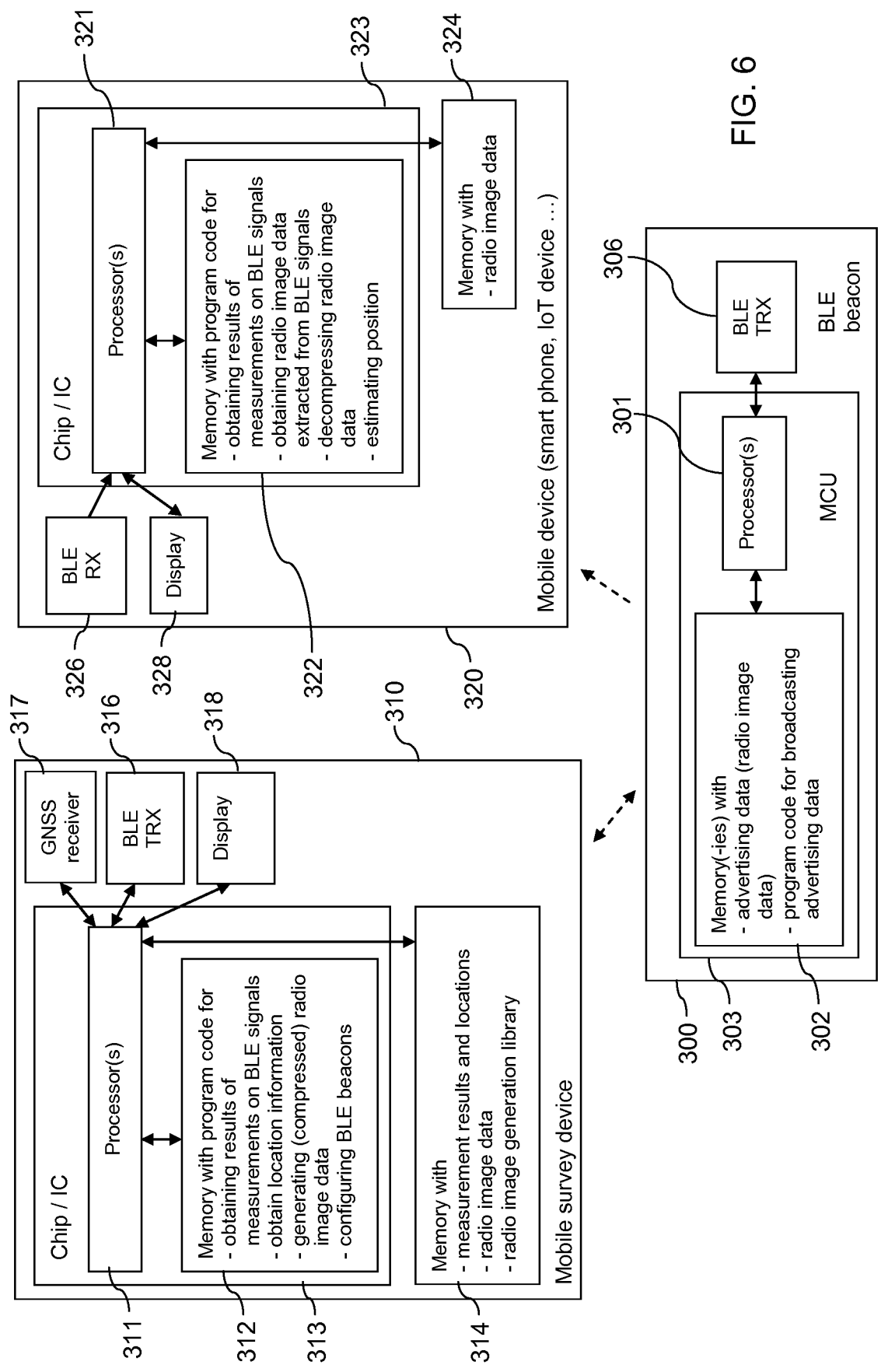
FIG. 6 is a schematic block diagram of an example embodiment of a system comprising an example embodiment of an apparatus according to the first aspect, an example embodiment of an apparatus according to the second aspect and an example embodiment of an apparatus according to the third aspect.

FIG. 6 is a schematic block diagram of an example embodiment of a system supporting a positioning of mobile device by the mobile devices themselves, the system making use of example embodiments of the three aspects of the invention.

The system comprises a plurality of BLE beacons 300, a mobile survey device 310 and mobile devices 320 that may desire to determine their own position.

The BLE beacons 300, of which only one is shown in FIG. 6, are distributed at a certain site. The BLE beacons are example positioning support devices. The BLE beacons may be evenly distributed.

Each BLE beacon 300 comprises at least one processor 301 that is linked to at least one memory 302 and to a BLE transceiver (TRX) 306.

Processor 301 is configured to execute computer program code, including computer program code stored in memory 302, in order to cause BLE beacon 300 to perform desired actions.

Memory 302 may be a main memory of BLE beacon 300. Memory 302 is configured to store advertising data and computer program code. Memory 302 stores computer program code for broadcasting advertising data and computer program code for updating advertising data in memory 302. Some of the data in memory 302 may be similar to the data in memory 102. Some of the program code in memory 302 may be similar to program code in memory 102. In addition, memory 302 may store computer program code configured to realize other functions. In addition, memory 302 may also store other kind of data, for instance a transmission frequency value.

Processor 301 and memory 302 may optionally belong to a microcontroller unit (MCU) 303 of an integrated circuit on a single chip. The integrated circuit or the chip may comprise in addition various other components, for instance a further processor or memory.

It is to be understood that the content of memory 302 may also be distributed to several memories. For example, a first memory may be provided for storing the computer program code and a second memory may be provided for storing data.

BLE transceiver 306 is a component which enables beacon 300 to transmit and receive signals in line with any current or future version of the Bluetooth standard supporting a low energy mode.

It is to be understood that beacon 300 may comprise various other components.

Component 303 or beacon 300 may be an example embodiment of an apparatus according to the first aspect of the invention.

While only a single beacon 300 is depicted in FIG. 6, it is to be understood that other beacons of the plurality of BLE beacons may have the same or similar structure as beacon 300.

Mobile survey device 310 may be for instance a regular mobile terminal, like a smartphone or general purpose tablet PC, or a dedicated survey device. Mobile survey device 310 comprises a processor 311 that is linked to a first memory 312, to a second memory 314, to a BLE component 316, optionally to at least one GNSS receiver 317 and to a display 318.

Processor 311 is configured to execute computer program code, including computer program code stored in memory 312, in order to cause mobile survey device 310 to perform desired actions.

Memory 312 stores computer program code for obtaining results of measurements on BLE signals, computer program code for obtaining location information, computer program code for generating radio image data and computer program code for configuring BLE beacons. All of this computer program code may belong for instance to a survey application. Some of the program code in memory 312 may be similar to program code according to the second aspect in memory 202. In addition, memory 312 may store computer program code configured to realize other functions, for instance computer program code for providing feedback to a user of mobile survey device 310 on the progress of a current survey, etc. In addition, memory 312 may also store any kind of data.

Processor 311 and memory 312 may optionally belong to a chip or an integrated circuit 313, which may comprise in addition various other components, for instance a further processor or memory.

Memory 314 is configured to store data, including for example results of measurements on BLE signals, locations of measurement and generated radio image data. It may be configured to store any other desired data as well. It may store for instance a radio image generation library, which may comprise any basic information that is required for generating radio image data.

BLE component 316 includes at least a BLE transceiver (TRX). BLE component 316 is configured to scan for radio signals that are broadcast by BLE beacons 300 and to perform radio measurements on such radio signals. In addition, BLE component 316 is configured to enable mobile survey device 310 to establish a BLE connection with BLE beacons 300. It is to be understood that any computer program code required for receiving, evaluating and transmitting BLE signals may be stored in an own memory of BLE component 316 and executed by an own processor of BLE component 316, or it may be stored for example in memory 312 and executed for example by processor 311.

The at least one GNSS receiver 317 may comprise any kind of global navigation satellite signal receiver, for example a GPS receiver and/or a GLONASS receiver and/or a GALILEO receiver. It may be configured to receive corresponding satellite signals and to determine the current position of mobile survey device 310 based on the signals, possibly using provided assistance data.

Display 318 may be for instance a touchscreen.

It is to be understood that mobile survey device 310 may comprise various other components, like further user input and output means, a cellular communication component enabling a communication via cellular communication networks and/or a WLAN component enabling a communication via WLANs.

Component 313 or mobile survey device 310 may be an example embodiment of an apparatus according to the second aspect of the invention.

It is to be understood that several mobile survey devices 310 could be provided for use in the system of FIG. 6.

Also of the mobile devices 320 that may desire to determine their own position only one is shown in FIG. 6. Each mobile device 320 may be for instance a regular mobile terminal, like a smartphone or general purpose tablet PC, or it may be for instance an IoT device, like a smart watch or a smart band, etc. Mobile device 320 comprises a processor 321 that is linked to a first memory 322, to a second memory 324, to a BLE component 326 and to a display 328.

Processor 321 is configured to execute computer program code, including computer program code stored in memory 322, in order to cause mobile survey device 320 to perform desired actions.

Memory 322 stores computer program code for obtaining results of measurements on BLE signals, computer program code for obtaining radio image data extracted from BLE signals, computer program code for decompressing and/or otherwise processing extracted radio image data and computer program code for estimating a position of mobile device 320. All of this computer program code may belong to a positioning application. Some of the program code in memory 322 may be similar to program code according to the third aspect in memory 202. In addition, memory 322 may store computer program code configured to realize other functions, for instance computer program code of various applications, some of which may rely on being provided with an estimate of the current position of mobile device 320. In addition, memory 322 may also store other kind of data.

Processor 321 and memory 322 may optionally belong to a chip or an integrated circuit 323, which may comprise in addition various other components, for instance a further processor or memory.

Memory 324 is configured to store data, including for example results of the latest measurements on BLE signals and recently received and/or processed radio image data. It may be configured to store any other desired data as well.

BLE component 326 includes at least a BLE receiver (RX). It is to be understood that the BLE receiver may also be a part of a BLE transceiver. BLE component 326 is configured to scan for radio signals that are broadcast by BLE beacons 300, to perform radio measurements on such radio signals and to extract advertising data contained in detected BLE signals. It is to be understood that any computer program code based processing required for receiving and evaluating BLE signals may be stored in an own memory of BLE component 326 and executed by an own processor of BLE component 326, or it may be stored for example in memory 322 and executed for example by processor 321.

Display 328 may be for instance a touchscreen.

It is to be understood that mobile device 320 may comprise various other components, like further user input and output means. Furthermore, while the invention enables a positioning of mobile devices that have neither a cellular communication component enabling a communication via cellular communication networks nor a WLAN component enabling a communication via WLANs, it is to be understood that certain embodiments of mobile device 320 may comprise such components as well.

Component 323 or mobile device 320 may be an example embodiment of an apparatus according to the third aspect of the invention.

While only a single mobile device 320 is depicted in FIG. 6, it is to be understood that other mobile devices may have the same or similar structure as mobile device 320.

An example implementation and use of the system of FIG. 6 may be summarized as comprising the steps of placing BLE beacons in an environment, surveying a site and generating radio images, configuring beacons to transmit radio image data as advertising data, and positioning mobile devices using BLE advertising data.

Corresponding example operations in the system of FIG. 6 will now be described with reference to FIGS. 7 to 10.

The BLE beacons 300 of the system of FIG. 6 are arranged at a localization site, by way of example in a large building like a shopping mall, such that at least one BLE beacon may be observed at each location of the localization site at which a positioning of mobile devices is to be supported. The BLE beacons 300 may be placed for example in the form of a grid with a specified distance, approximately, between the BLE beacons 300, such that the location of each BLE beacon may be considered a grid point of the grid. The specified distance may be selected depending on the transmission power and thus the coverage range of the BLE beacons 300; in an example embodiment, the distance may be set to 8 meters. The BLE beacons 300 may or may not be physically fixed to their location, but in any case, it is assumed that all or most of them will remain at their location for a longer time.

Figure 7:
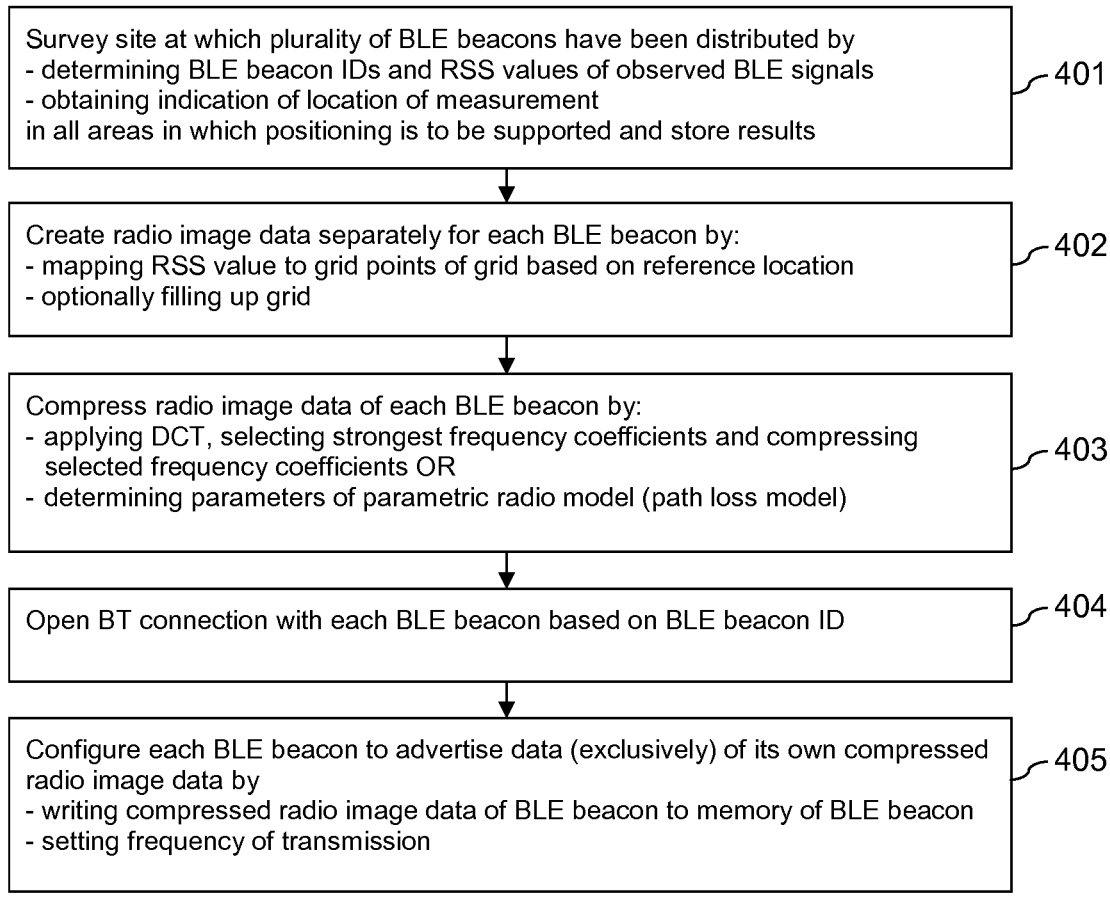
FIG. 7 is a flow chart illustrating an example embodiment of operations in the system of FIG. 6.

FIG. 7 is a flow chart illustrating example operations at mobile survey device 310. Processor 311 and some of the program code stored in memory 312 may cause mobile survey device 310 to perform the presented actions when the program code is retrieved from memory 312 and executed by processor 311.

The purpose of the operations of FIG. 7 is to detect radio images of each of a plurality of BLE beacons 300 distributed in the building and to configure the BLE beacons 300 based on the obtained information. The operations may be performed only once—or be repeated at fairly long intervals in order to enable updates in the case of changes in the arrangement of BLE beacons or changes in the radio environment due to construction measures, like relocation of internal walls, etc.

A survey agent using mobile survey device 310 is requested to activate a survey application of mobile survey device 310 and to visit all areas of interest at which a positioning is to be supported so that mobile survey device 310 may survey the radio environment of the building. (action 401)

The survey application may activate to this end BLE component 316. BLE component 316 scans for radio signals from BLE beacons 300 in the environment at regular intervals while the survey agent is slowly moving through the building. The survey agent may be guided, for instance, by a floor plan displayed on display 318 of mobile survey device 310. Whenever BLE component 316 detects at least one BLE radio signal during a scan, BLE component 316 measures the received signal strength (RSS) of each radio signal and extracts a medium access control (MAC) address of the transmitting BLE beacon 300 from the radio signal. The measured radio signal strength values may then be considered to be characteristics of the observed radio signals and the MAC addresses may be considered identifiers (ID) of the BLE beacons transmitting the radio signals.

In addition, an indication of the current position of mobile survey device 310 is obtained for each location at which measurements are performed during a scan. The survey agent may be required for example to enter information on a respective measurement location, for instance based on a grid covering the floor plan presented on display 318. The survey agent may be enabled to enter such information in various ways via any kind of user interface. The input as such may be enabled for instance by means of a touch sensitive screen of display 318 or by means of keys and/or buttons of mobile survey device 310 in combination with a display of mobile survey device 310 that is not touch sensitive. Alternatively, GNSS receiver 317 may be activated automatically as well by the survey application. GNSS receiver 317 may capture satellite signals and estimate the position of mobile survey device 310 at the same regular intervals in which scans for BLE radio signals are performed, for example once per second. Since the satellite signals may be difficult to receive within buildings, such a positioning may be an assisted GNSS (AGNSS) based positioning using available assistance data. The assistance data may be provided for example by some GNSS assistance server via a cellular communication network. The indicated position may have a horizontal component, for instance a longitude value and a latitude value, or easting and northing values. In addition, it may have an indication of the floor on which the survey agent is located. The indication of the floor may be obtained for instance in either case from a general input by the survey agent when reaching a new floor. Alternatively, the position estimated by GNSS receiver 317 may include an altitude component, and the altitude may be mapped to a respective floor based on a reference altitude of the ground floor and some general or building specific information on the height of floors.

In the case of a GNSS based positioning, an indication of the respective position of the survey agent may be indicated on the floor plan as well as a further guidance. Alternatively, the survey agent may try to uniformly pass through all parts of the building on his own. Some feedback may equally be given to the survey agent on display 318 to indicate which areas have already been covered.

It is to be understood that alternatively or in addition, other means may be used for determining the locations of measurements. For example, at least one motion sensor, like an accelerometer and/or a gyroscope, and/or a magnetometer may also be used in combination with a manual input or with GNSS estimated positions to collect information on the locations of measurements.

The RSS values and the associated BLE beacon IDs obtained during a scan as well as the obtained indication of the location of measurement are stored in memory 314.

Once the survey of the building has been completed, mobile survey device 310 creates radio image data separately for each BLE beacon 300 based on the stored data. (action 402)

To this end, mobile survey device 310 defines for each BLE beacon 300 for which data is stored a grid, with grid points corresponding to geographical locations in the building, such that the grid covers at least the coverage area of the particular BLE beacon 300. The grid may be of predetermined size; or the size may be adjusted based on the locations of measurements at which signals of the particular BLE beacon 300 have been detected. The grid may be a three-dimensional grid having for instance the form of a cuboid, in order to cover different floors of the building. Alternatively, a separate rectangular two-dimensional grid may be defined for each floor of the building on which radio signals of the particular BLE beacon 300 have been detected. Mobile survey device 310 then maps each stored RSS value that is associated in memory 314 with the BLE beacon identifier of the particular BLE beacon 300 to a grid point of the grid defined for this BLE beacon. The grid point to which the RSS value is mapped corresponds to a geographical location that is closest to the location of measurement associated in memory 314 with the RSS value. If several RSS values for the same BLE beacon 300 would have to be mapped to the same grid point, these RSS values may be averaged and the average value may be mapped to the grid point of the grid that is defined for the particular BLE beacon 300.

There may be some grid points of the grids to which no RSS values have been mapped. In case the further processing requires grids with an RSS value mapped to each grid point, these grid points without RSS values may be provided with RSS values by interpolating surrounding RSS values if possible, and by extrapolating neighboring RSS values otherwise.

Figure 8:
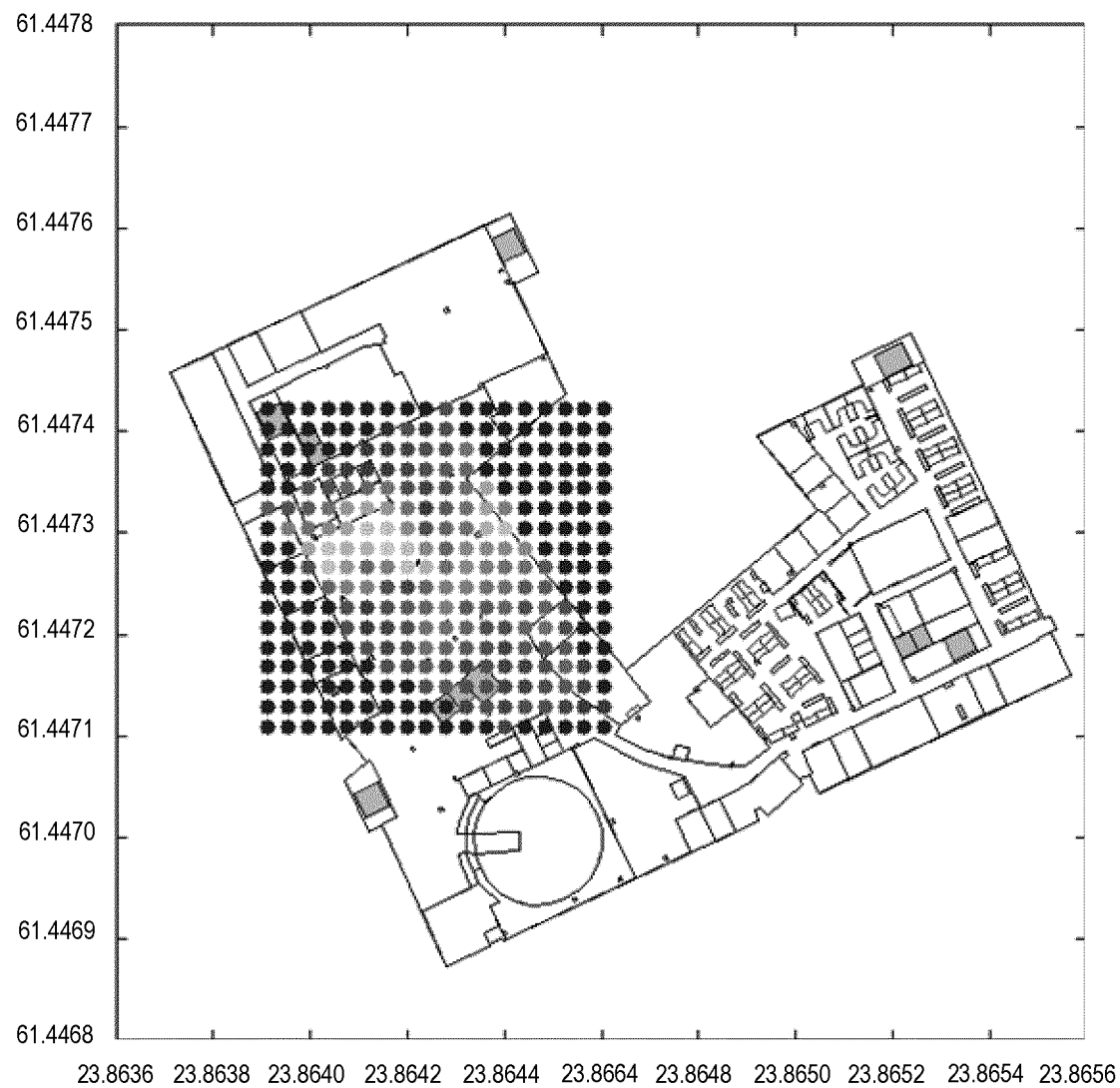
FIG. 8 is a diagram illustrating example details of the operations of FIG. 7.

An example two-dimensional radio image in the form of a filled up grid is illustrated in FIG. 8. FIG. 8 shows the floor plan of a floor of a building with associated longitude values on an x-axis and associated latitude values on a y-axis. In addition, it shows dots corresponding to grid points of a rectangular grid. The grid represents a radio image for a selected BLE beacon. In the radio image, different levels of grey represent different RSS values. Each grid point is colored with a level of grey that corresponds to an RSS value at the geographical location represented by the grid point. The brightest grid points in an area somewhat to the left of the center of the rectangle correspond to the location of the BLE beacon, where the highest RSS values have been observed, for instance RSS values in the range of −70 dBm. The brightness of the grid points decreases towards the edges of the rectangle, indicating decreasing observed RSS values.

Mobile survey device 310 may now compress the radio image of each BLE beacon. (action 403)

There are several options to realize such a compression of radio image data.

The radio image may be compressed for instance by applying a discrete cosine transform (DCT) to the radio image data. If the RSS values mapped to the grid points of a K-dimensional grid are represented as elements of a K-dimensional matrix, applying a DCT to this matrix will result a matrix of the same dimension and size. Each matrix element of the resulting matrix may be considered a DCT component that is composed of a DCT index defining the position in the matrix and a DCT value. A compression may now be achieved by selecting the DCT components with the highest DCT values. The DCT indices of the selected DCT components and/or the DCT values of the selected DCT components may be compressed further using a lossless compression technique. The DC component, which indicates the average of the RSS values, may optionally be excluded from such a further compression operations.

A DCT compression of the radio image of a BLE beacon 300 may be suited to reduce the size of the image to few tens of bytes. The following table shows a representation of the example radio image of a BLE beacon as presented in FIG. 8 after DCT compression:

| Origin (Lat; long; floor) | Radio image | | | | | | | | |
|---|---|---|---|---|---|---|---|---|---|
| | | | | | AC components | | | | |
| [61.45; 23.68; 2] | Image offset [−148; 96;0] | Image size [17; 18] | DC Component −99 | Offset Value | 3 −58 | 0 −51 | 0 30 | 5 23 | 0 20 |

Here, the origin may be for instance a common reference location that is defined by an arbitrary latitude value, an arbitrary longitude value and an arbitrary floor number. The origin does not necessarily lie inside the radio image or correspond to any of its corners; it may be hundreds of meters away from the area covered by the radio image and even from the area covered by all radio images that may be generated for the building. This allows using one origin for models that are close by and combine them easier during position calculation. A model may be understood here for instance to be the entirety of all radio image data that are assembled for a particular building or for any other localization site. Alternatively, a separate origin may be defined for example for each building, e.g. composed of the smallest latitude value and the smallest longitude value defining the area of the building and a median floor number.

The image offset may indicate an offset of a reference grid point of the considered grid for a particular floor to the origin. The radio image offset for longitude and latitude is in units which are not necessarily degrees, but may be other arbitrary units, e.g. meters. In the presented example case, the unit is equal to 5/1024*0.001*HF degrees in latitude and 5/1024*0.001*HF*SF degrees in longitude, where HF is a number equal to 2 in some integer power (in this case 4), and SF is a scaling factor that equalizes degree units in longitude and latitude in the metric domain and is equal to $$\frac{1-e^2}{(1-e^2\sin^2(\varphi)\cdot\cos(\varphi))},$$

where e is an Earth eccentricity equal to 0.08181919092890624, and $\varphi$ is a latitude of the origin in radians. The image size may indicate the number of grid points in each direction starting from the reference grid point, and thus the size of a matrix to which the DCT may be applied.

The DC component of the radio image is calculated as the mean value of all elements of the original radio image.

The AC components are selected elements of a DCT representation of a zero mean radio image, that is, the radio image with subtracted DC component. An AC component is a pair of AC value and AC index (that is, the index of the element in the DCT matrix). In the presented example embodiment, only the five AC components with the largest magnitudes (squared AC values) are selected and stored. It is to be understood that any other number may be selected as well. The selected AC components enable a reconstruction of a radio image that is smoother but very similar to the original radio image. The selected AC components may be represented by the AC values of the selected AC components and associated AC offsets, which may constitute a losslessly compressed version of the AC indices. An example computation of such AC offsets will be described in the following.

For the example AC values of the selected AC components:

| -58 | -51 | 30 | 23 | 20 |
|---|---|---|---|---| the original AC indices of the selected AC components may be:

| 3 | 1 | 3  | 2 | 4 |
|---|---|----|---|---|
| 1 | 3 | .3 | 2 | 2 |

Here, each column represents the index for one AC value. These AC indices may be further represented in a more compact way as a zigzag offsets. Offsets corresponding to 2D indices may be calculated to this end by traversing the DCT image (matrix) in zigzag fashion and transforming the 2D indices into 1D indices, and then transforming consecutive 1D indices into offsets, where each offset represents the number of zero elements between the previous and the current AC component. The determination of zigzag offsets for current example is presented in FIG. 15:

The zigzag offsets for the AC values of FIG. 15 are as thus follows:

| 3 | 0 | 0 | 5 | 0 |
|---|---|---|---|---|

The AC values and the associated offsets may be further compressed using a Huffman coding with a fixed codebook.

It is to be understood that other frequency transforms than DCT may be used as well, which may be more complex but not require a grid with RSS values mapped to each grid point.

Alternatively, the radio image may be compressed by computing parameters of a parametric radio model of the radio environment of each BLE beacon 300, like a path loss model, based on the radio image data. This would allow representing the radio image of each BLE beacon 300 by a limited set of parameter values, like the location of the BLE beacon 300, a transmission power or apparent transmission power of the BLE beacon 300, and a path loss exponent. The apparent transmission power may be a transmission power that is observed or estimated to be observable at a reference distance from an estimated location of the BLE beacon 300, for instance at a distance of 1 meter. Such parameters may be computed for instance using a Gauss-Newton method. While a compression by means of a frequency transform may enable a more accurate reconstruction of the original radio image, the use of a parametric radio model may enable a particularly high compression of data. The latter approach would equally not require a filling up missing RSS values of the grid.

Any basic data that may be required for actions 401 to 403, like coordinates of an origin, floor plans, grid sizes and grid steps, default values, etc., may be comprised in the radio image generation library stored in memory 314.

It is to be understood that any desired further processing may be applied to the compressed radio image data, for instance encryption operations, etc., as long as the original radio image data may be reconstructed with satisfactory quality.

Mobile survey device 310 now subsequently establishes a regular BLE connection with each detected BLE beacon 300. (action 404) This may be performed based on the stored BLE beacon IDs. The survey agent needs to revisit to this end the coverage area of each BLE beacon 300. Mobile survey device 310 may guide the survey agent for instance to the location corresponding to the grid point to which the strongest RSS value was mapped for each BLE beacon 300, using a corresponding indication on the display of mobile survey device 310.

Once a connection with a particular BLE beacon 300 has been established, mobile survey device 310 configures this BLE beacon 300 to advertise the generated, compressed data of its own radio image. (action 405) To this end, mobile survey device 310 causes BLE beacon 300 to store the compressed data in an advertising data section of its main memory 302. In addition, mobile survey device 310 may set a frequency that is to be used by the BLE beacon 300 for broadcasting advertising data. Mobile survey device 310 may use a fixed frequency to this end. For example, if the BLE advertising data allows 31 octets to send beacon specific advertising data, for most of the beacons two to three advertising packets will be enough to transfer DCT compressed radio image data. The typical size of DCT compressed data of a radio image in a building may be 60 Bytes, and this will allow transmission of the radio image data within a second if a transmission frequency of advertising packets of 2 Hz is set. Alternatively, mobile survey device 310 may determine a frequency of transmission of advertising data such that all of the compressed data of the radio image may be advertised within a desired period of time, for example within a second. It is to be understood that the advertising data that is stored in memory 302 of BLE beacon 300 and broadcast by BLE beacon 300 using the set transmission frequency may not be limited to the compressed radio image data. Thus in the broadcast of BLE beacon 300, the compressed radio image data may alternate with any other data that may be stored in the advertising data section of memory 302.

Figure 9:
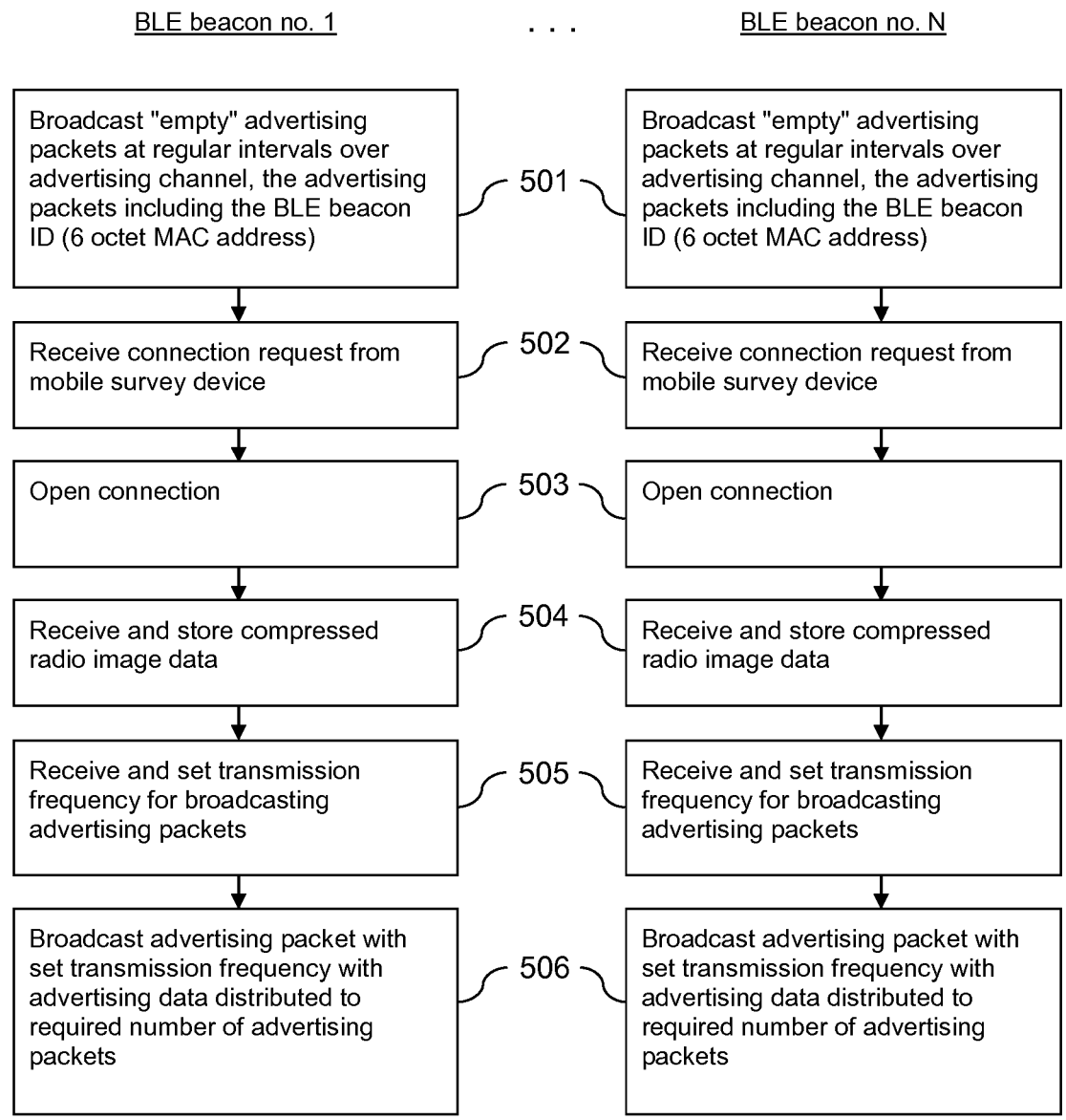
FIG. 9 is a flow chart illustrating an example embodiment of further operations in the system of FIG. 6.

FIG. 9 is a flow chart illustrating example operations at each of N BLE beacons 300. Processor 301 and some of the program code stored in memory 302 of the respective BLE beacon 300 may cause this BLE beacon 300 to perform the presented actions when the program code is retrieved from memory 302 and executed by processor 301.

The purpose of the operations of FIG. 9 is that each of the BLE beacons 300 is configured to broadcast its own compressed radio image data.

After having been placed at its location within the building and activated, BLE beacon 300 broadcasts "empty" advertising packets at regular intervals over a low energy (LE) advertising broadcast channel. (action 501)

The following example details are based on the Specification of the Bluetooth® System Version 4.2 of Dec. 2, 2014 by the Bluetooth SIG. For further details, reference is made to this specification.

The LE advertising broadcast channel is provided to set up connections between two devices or to communicate broadcast information between unconnected devices. The LE advertising broadcast channel is a set of three fixed physical channels.

Each BLE packet that is transmitted over the air interface has a defined packet format that is used on a link layer for both advertising channel packets and data channel packets. The packet comprises a preamble of 1 octet, an access address of 4 octets, a packet data unit (PDU) of 2 to 257 octets, and a cyclic redundancy check value (CRC) of 3 octets. Advertising channel packets use a fixed value for the preamble and for the access address of the BLE packet. When a BLE packet is transmitted in an advertising physical channel, the PDU is a specifically defined advertising channel PDU. The CRC is calculated over the PDU.

The specifically defined advertising channel PDU comprises a header of 16 bits and a payload.

The header comprises, among other fields, a field for indicating a PDU type, a TxAdd field and a length field for indicating the payload length in octets. The possible range of the payload length is 6 to 37 octets.

The payload comprises an AdvA field of 6 octets for indicating a beacon's public or random device address, as indicated by the one bit TxAdd field in the header. In the present case, the beacon's public device address in the form of a 6 octet MAC address may be used, and the bit of the TxAdd field may be set to "0". The 6 octet MAC address functions as BLE beacon ID. The payload further comprises an AdvData field of 0 to 31 octets. The AdvData field may receive advertising data of any type that is stored in the advertising data section of main memory 302 of BLE beacon 300. In action 501, no data may be entered into this field when assembling and broadcasting advertising packets at regular intervals and thus the field may have a length of zero octets. Such advertising packets may be considered "empty" advertising packets. It is to be understood, however, that if the advertising data section of main memory 302 of BLE beacon 300 already contains some other data than compressed radio image data, this data may be contained in or distributed to AdvData fields of the broadcast advertising packets.

It is to be understood that any other packet format could be used just the same, for example though not exclusively a packet structure providing for an advertising data field of up to 255 octets in line with future Bluetooth specifications, etc.

The transmission intervals for the broadcast of advertising packets may be set to a default value. It may also comprise a random component in order to enable mobile devices to detect signals from all BLE beacons in the neighborhood.

When broadcasting empty advertising packets or advertising packets with other advertising data than compressed radio image data, BLE beacon 300 may receive a connection request from a mobile survey device 310. This request may be transmitted by mobile survey device 310 in the scope of action 404 of FIG. 7. (action 502)

BLE beacon 300 thereupon opens the connection. (503)

Via the established connection, BLE beacon 300 receives from mobile survey device 310 compressed radio image data. The compressed radio image data corresponds to the compressed radio image data that was generated by mobile survey device 310 in actions 402 and 403 specifically for the BLE beacon 300 receiving the data, and it contains exclusively compressed radio image data for the BLE beacon 300 receiving the data. BLE beacon 300 stores the data in the advertising data section of main memory 302. (action 504) In case the advertising data section of main memory 302 already contains other data, the received compressed radio image data may be added to this data.

Via the established connection, BLE beacon 300 furthermore receives from mobile survey device 310 a desired transmission frequency for broadcasting advertising packets. BLE beacon 300 sets the transmission frequency accordingly, for instance by storing a corresponding indication in main memory 302. (action 505)

As a result, BLE beacon 300 has been configured in line with the invention.

Thereafter, BLE beacon 300 broadcasts advertising packets with the set frequency. The content of the data stored in the advertising data section of main memory 302 is distributed to the AdvData fields of the payload of the advertising PDUs of the required number of subsequent advertising packets. (action 506)

Figure 10:
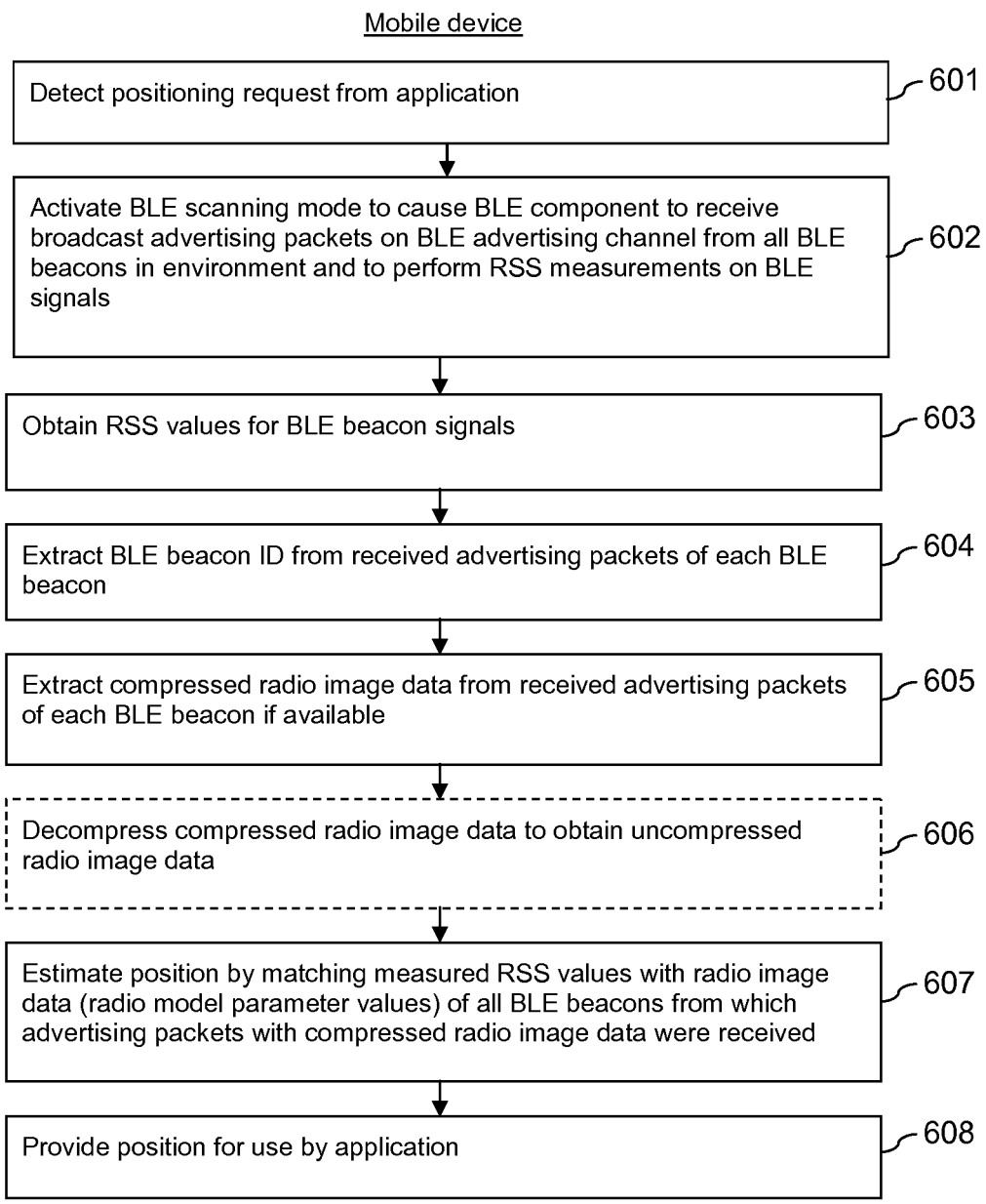
FIG. 10 is a flow chart illustrating an example embodiment of further operations in the system of FIG. 6.

FIG. 10 is a flow chart illustrating example operations at mobile device 320. Processor 321 and some of the program code stored in memory 322 may cause mobile survey device 320 to perform the presented actions when the program code is retrieved from memory 322 and executed by processor 321.

The purpose of the operations of FIG. 10 is to enable mobile device 320 to determine its own position without the need to download a large amount of assistance data via the Internet.

When some application of mobile device 320 requires the position of mobile device 320, a corresponding positioning request by this application may call up the positioning application of mobile device 320. (action 601)

The positioning application may activate a scanning mode of BLE component 326. (action 602) BLE component 326 thereupon scans the environment for radio signals on any BLE advertising channel and receives BLE advertising packets that are broadcast by BLE beacons 300 over any of the BLE advertising channels. The BLE component 326 also measures the received signal strength of the detected BLE radio signals.

Mobile device 320 thereby obtains RSS values for detected BLE beacon signals. (action 603) In addition, mobile device 320 extracts the MAC address from received advertising packets as respective BLE beacon identifier. (action 604)

In addition, mobile device 320 extracts compressed radio image data from received advertising packets. (action 605) The complete radio image data for a BLE beacon 300 may be distributed to two or more advertising packets broadcast by the BLE beacon 300. Mobile device 320 may therefore combine for each BLE beacon 300 the data from several packets taking account of the contained MAC address to obtain complete radio image data for each BLE beacon 300. In case a received advertising packet contains other data than radio image data, the packet may be discarded or used for other purposes.

The compressed radio image data may be for instance in the form of parameter values of a parametric path loss model or in the form of compressed DCT components of DCT transformed radio image data.

In the latter case, mobile device 320 decompresses the compressed radio data. (action 606) This may comprise decompressing at first compressed selected DCT components, in case selected DCT components have been compressed by mobile survey device 310. It may further comprise constructing a matrix, using the selected DCT components as matrix elements and setting the DCT value of the other matrix elements to zero. The required size of the matrix may be contained in the compressed radio data. It may further comprise applying an inverse DCT to the matrix to obtain reconstructed radio image data.

Depending on the further processing, mobile device 320 may also decompress compressed radio image data in case such data is received in the form of parameter values of a parametric path loss model. (action 606) This may be achieved by computing for each grid point of a grid a received signal strength value that may be expected at a location corresponding to the respective grid point based on the path loss model.

It is to be understood, however, that the path loss model may also be evaluated directly without generating a decompressed radio image first.

Mobile device 320 estimates its position by matching the received signal strength values measured in action 602 with the radio image data of all BLE beacons 300 for which compressed radio image data could be extracted from received advertising packets. (action 607)

The position may be estimated for instance by determining a geographical location which is represented by a respective grid point of the grid of a radio image of all BLE beacons 300 for which radio image data is available. The geographical location is further selected such that it results in the minimum total difference (determined e.g. as the sum of absolute values or as Euclidian distance) between the respective received signal strength value measured for the BLE beacons and the respective received signal strength value for these BLE beacons expected at the grid point of the grid of the radio image of the respective BLE beacon.

The position may also be estimated by calculating likelihood values by matching the received signal strength values of at least one BLE beacon with the radio image data of at least one BLE beacon for which radio image data has been obtained.

The likelihood L of the position being at a location with indices i,j,k is calculated according to the following formula:

$$L_{i,j,k} = \prod_{s=1}^{N^{AP}} \frac{1}{\sqrt{2\pi\sigma_{rss}^2}} \cdot e^{\left(-\frac{(expectedRSS_{i,j,k}^s - measuredRSS^s)^2}{2\sigma_{rss}^2}\right)},$$

where i,j,k are indices of the physical location (i,j representing horizontal coordinates, k representing vertical coordinate). The variable $N^{AP}$ is the number of BLE beacons used for the position estimation, i.e. the beacons for which radio image data is available and for which a radio signal was measured by mobile device 320 at its current position. The variable $expectedRSS^s_{i,j,k}$ is an expected RSS value from a beacon with index s at a location with indices i,j,k. This value is taken from the radio image data; it is equal to the image element corresponding to the indices i,j,k. The variable $measuredRSS^s$ is an RSS value from the BLE beacon with index s, measured by mobile device 320 at its current position. The variable $\sigma_{RSS}$ is the standard deviation of RSS noise, which is assumed to be normal with zero mean. This is a configuration parameter, e.g. 4.73.

Once the likelihood L for different locations represented by indices i,j,k has been calculated, the position of mobile device 320 may be estimated, for example, as the location for which the likelihood achieves the maximum value.

In case the extracted compressed radio image data comprises parameter values of parametric radio models for each detected BLE beacon 300, a position may be estimated by defining circles around BLE beacon positions defined by the parameter values, the radius of each circle being computed using the radio model for the respective BLE beacon 300 and the received signal strength value measured for the respective BLE beacon 300. The position may then be estimated to correspond to an intersection point of all circles.

The estimated position may then be provided for use by the application requesting the position. (action 609) The application may present the estimated position for instance to a user of mobile device 320 via display 328.

It is to be understood that received radio image data of a particular BLE beacon 300 does not have to be decompressed in action 607 each time a new scan is performed while mobile device 320 is moving in a limited area in which signals of the same BLE beacons 300 may be observed repeatedly. A small amount of decompressed radio image data may be stored in memory 324 and be reused even if memory 324 of mobile device 320 is fairly small. Decompressed radio image data may be stored for instance for a predetermined period of time. Alternatively, it would be possible, for instance, to keep decompressed radio image data for a predetermined number of BLE beacons 300 that have been detected most recently by mobile device 320.

Figure 11:
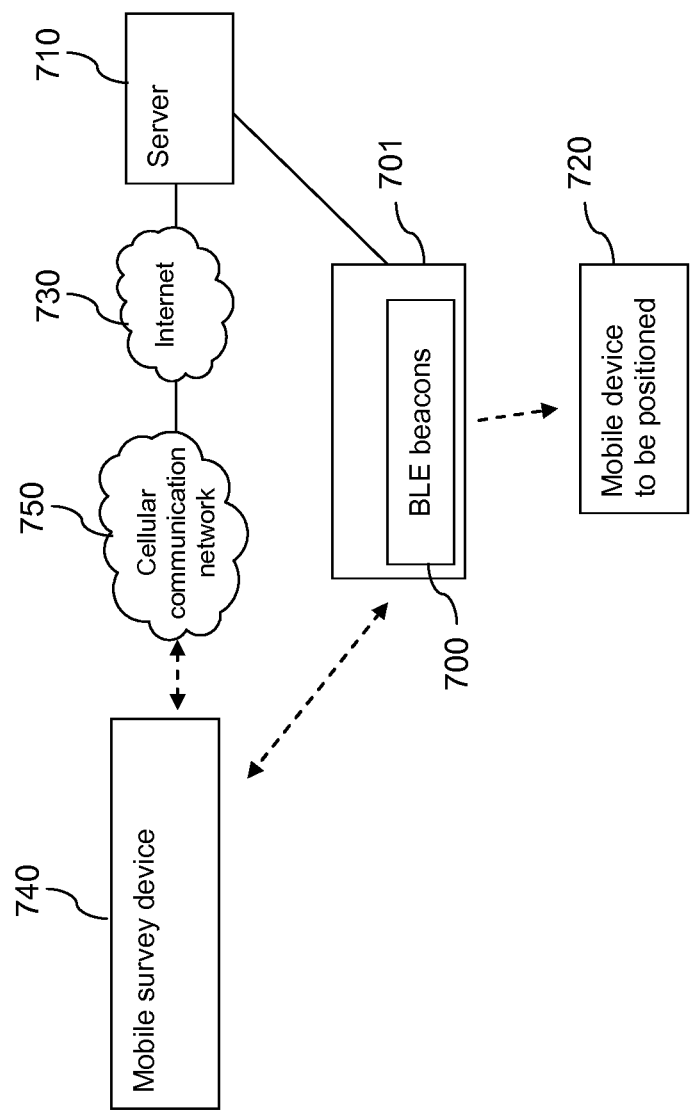
FIG. 11 is a schematic block diagram of a further example embodiment of a system comprising an example embodiment of an apparatus according to the first aspect, an example embodiment of an apparatus according to the second aspect and an example embodiment of an apparatus according to the third aspect.

FIG. 11 is a schematic block diagram of another example embodiment of a system supporting a positioning of a mobile device by the mobile device, the system making use of example embodiments of the three aspects of the invention.

The system comprises a plurality of BLE beacons 700, a server 710 and mobile devices 720 that may desire to determine their own position. Each of the BLE beacons 700 may be integrated in a device 701 that comprises a further communication interface. Server 710 may be a server that is provided for a specific building, and it may be enabled to access devices 701 for instance via a local area network (LAN) or a WLAN of the building. Alternatively, server 710 may be a general service providing server and may be enabled to access devices 701 via the Internet 730.

The system may comprise in addition at least one mobile survey device 740. Server 710 may be enabled to communicate with other devices via the Internet 730. Mobile survey device 740 may be enabled to communicate with servers that are accessible via the Internet 730 using a cellular communication network 750 connected to the Internet 730. Cellular communication network 750 may be any kind of cellular communication network, like a Global System for Mobile Communications (GSM), a CDMA2000, a Universal Mobile Telecommunications System (UMTS), or a long term evolution (LTE) based communication network. It is to be understood that alternatively or in addition, mobile survey device 740 may be enabled to use a wireless local area network (WLAN) for communicating with server 710 via the Internet 730.

Operations in the system of FIG. 11 may be basically the same as operations in the system of FIG. 6. Only the tasks of mobile survey device 310 of FIG. 6 as illustrated in FIG. 7 are split up in this case between mobile survey device 740 and server 710. For example, action 401 may be performed by mobile survey device 740, which may then transmit the collected data to server 710. Server 710 may then perform actions 402 to 405. The configuration of BLE beacons 700 may then be caused by server 710 via device 701 comprising the respective BLE beacon 700 using any other communication channel than Bluetooth which is supported by both server 710 and device 701. Accordingly, actions 502 and 503 of FIG. 9 may be omitted.

It is to be understood that the presented example systems, apparatuses and operations may be varied in many ways. The operations may be varied for instance by modifying actions, by omitting actions and/or by adding actions. In addition, the order of actions may be modified.

In an alternative embodiment, the positioning support devices may include for example other transmitters than BLE beacons, for example regular Bluetooth transmitters or ultra-sound transmitters, etc.

In an alternative embodiment, the location of measurement may be determined for example by other means than user input or GNSS based positioning, for instance using a WLAN based positioning.

In an alternative embodiment, the system may rely largely on BLE beacons that are already available at a localization site. Only as far as the BLE beacons are distributed too sparsely, additional BLE beacons may be used for supplementing the existing infrastructure.

In an alternative embodiment, the advertising data stored in the BLE beacons may not be based on survey data. The transmission power and path loss exponents of BLE beacons may be known for a particular type of BLE beacons and a person distributing the BLE beacons in a building may know or determine the coordinates at which each BLE beacon is arranged, for instance using a map or positioning capabilities of a smartphone. The advertising data may be assembled separately for each BLE beacon from this information, e.g. using a suitable application of a BLE enabled smartphone. The smartphone may then be used for configuring each of the BLE beacons using the respectively assembled data.

Summarized, certain embodiments of the invention provide for a self-contained positioning system which may not require any internet connectivity for positioning. In certain embodiments of the invention the whole system may be setup with a smart phone and few tags, like BLE beacons, only. Certain embodiments of the invention may be suited for a large number of users of the provided positioning service, as these users only have to rely on broadcast advertised data and thus on no individual connections. Certain embodiments of the invention using radio image data for the actual positioning enable a robust solution, since a radio image may be suited to capture the radio environment very effectively. Certain embodiments of the invention enable a positioning of mobile devices with very small memory, like IoT devices. Certain embodiments of the invention enable a positioning of smart phones or other mobile devices without requiring any proprietary hardware.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Figure 12:
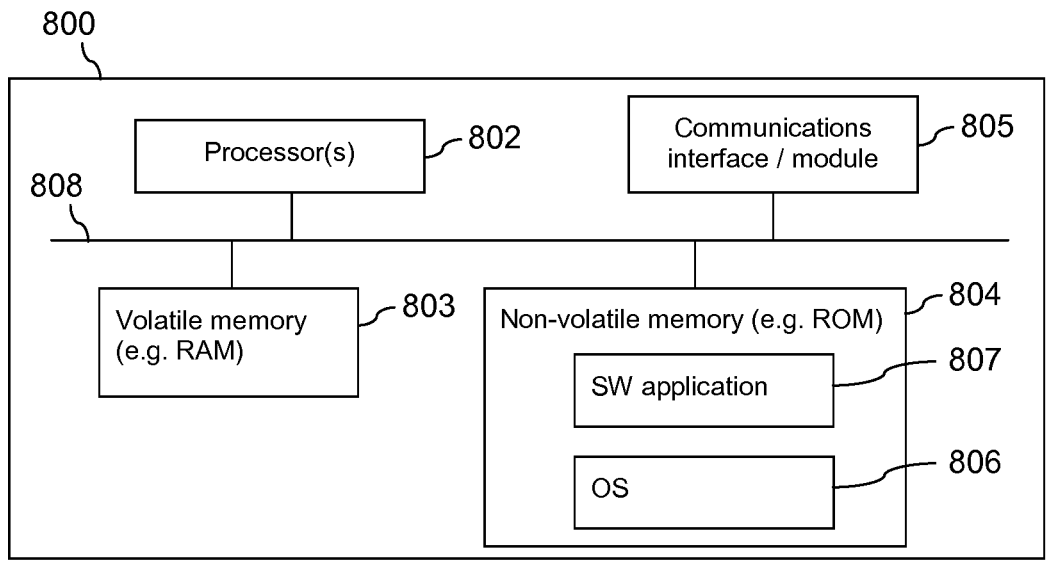
FIG. 12 is a schematic block diagram of an example embodiment of an apparatus.
Figure 13:
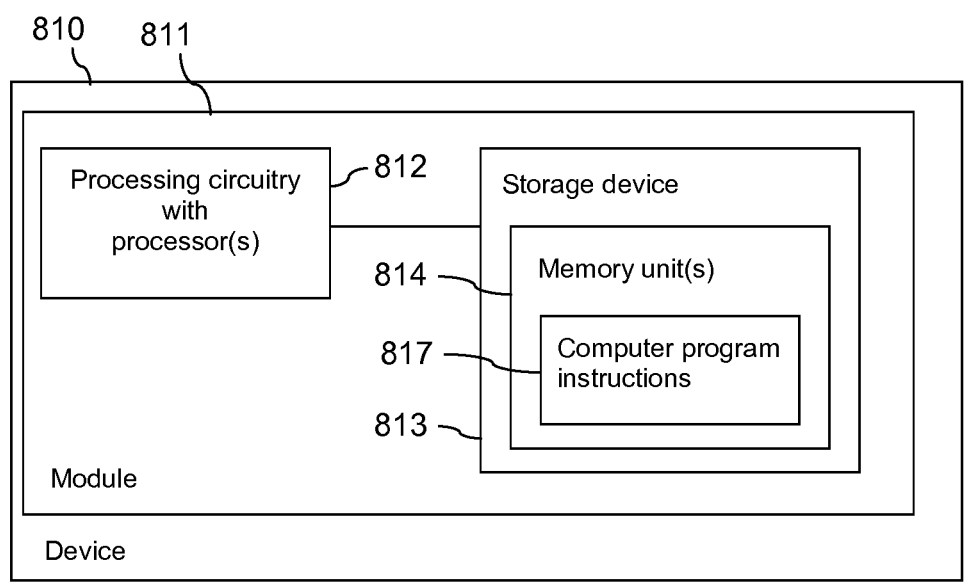
FIG. 13 is a schematic block diagram of an example embodiment of an apparatus.

Example embodiments using at least one processor and at least one memory as a non-transitory data medium are shown in FIGS. 12 and 13.

FIG. 12 is a schematic block diagram of a device 800. Device 800 includes a processor 802. Processor 802 is connected to a volatile memory 803, such as a RAM, by a bus 808. Bus 808 also connects processor 802 and RAM 803 to a non-volatile memory 804, such as a ROM. A communications interface or module 805 is coupled to bus 808, and thus also to processor 802 and memories 803, 804. Within ROM 804 is stored a software (SW) application 807. Software application 807 may be a positioning application, although it may take some other form as well. An operating system (OS) 806 also is stored in ROM 804.

FIG. 13 is a schematic block diagram of a device 810. Device 810 may take any suitable form. Generally speaking, device 810 may comprise processing circuitry 812, including one or more processors, and a storage device 813 comprising a single memory unit or a plurality of memory units 814. Storage device 813 may store computer program instructions 817 that, when loaded into processing circuitry 812, control the operation of device 810. Generally speaking, also a module 811 of device 810 may comprise processing circuitry 812, including one or more processors, and storage device 813 comprising a single memory unit or a plurality of memory units 814. Storage device 813 may store computer program instructions 817 that, when loaded into processing circuitry 812, control the operation of module 811.

The software application 807 of FIG. 12 and the computer program instructions 817 of FIG. 13, respectively, may correspond e.g. to the computer program code in any of memories 102, 202, 302, 312 or 322, respectively.

Figure 14:
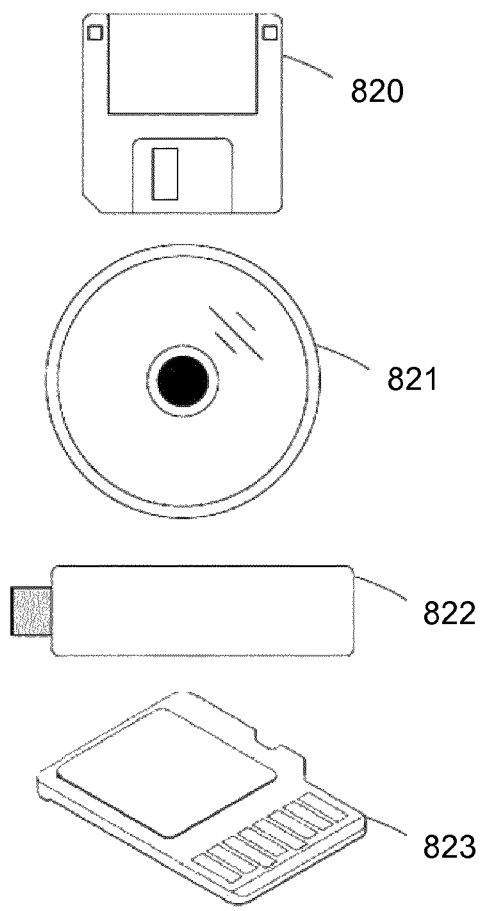
FIG. 14 schematically illustrates example removable storage devices.

In example embodiments, any non-transitory computer readable medium mentioned in this text could also be a removable/portable storage or a part of a removable/portable storage instead of an integrated storage. Example embodiments of such a removable storage are illustrated in FIG. 14, which presents, from top to bottom, schematic diagrams of a magnetic disc storage 820, of an optical disc storage 821, of a semiconductor memory circuit device storage 822 and of a Micro-SD semiconductor memory card storage 823.

The functions illustrated by processor 101 in combination with memory 102, or processor 301 in combination with memory 302, or component 303 can also be viewed as means for holding available, at a positioning support device, stored data which enables a determination of characteristics of radio signals transmitted by the positioning support device, wherein the characteristics of radio signals are expected to be observable at different locations; and means for automatically and repeatedly transmitting, by the positioning support device, the stored data to enable mobile devices receiving the data to determine their position based on the data.

The functions illustrated by processor 201 in combination with memory 202, or processor 311 in combination with memory 312, or component 313 can also be viewed as means for obtaining characteristics of radio signals, the radio signals transmitted by a plurality of positioning support devices and the characteristics of radio signals measured by at least one mobile device at each of a plurality of locations, obtaining identifications of the positioning support devices and obtaining indications of the locations of measurement; means for assembling based on the obtained characteristics of radio signals, the obtained identifications of the positioning support devices and the obtained indications of the locations of measurement separately for each of the positioning support devices data which enables a determination of characteristics of radio signals transmitted by the respective positioning support device, wherein the characteristics of radio signals are expected to be observable at different locations; and means for causing each of the plurality of positioning support devices to store the data assembled for the respective positioning support device as a basis for a repeated and automatic transmission of the data by the respective positioning support device to enable mobile devices receiving the data from at least one of the plurality of positioning support devices to determine their positions.

The program codes in memory 202—as far as provided for the second aspect—and memory 312 can also be viewed as comprising such means in the form of functional modules.

The functions illustrated by processor 201 in combination with memory 202, or processor 321 in combination with memory 322, or component 323 can also be viewed as means for obtaining at least one characteristic of at least one radio signal, the at least one radio signal transmitted by at least one positioning support device and the at least one characteristic of the at least one radio signal measured by a mobile device at a particular location, and obtaining an identification of the at least one positioning support device; means for extracting from the radio signals transmitted by each of the at least one positioning support device data which enables a determination of characteristics of radio signals transmitted by the respective positioning support device that are expected to be observable at different locations; and means for estimating a position of the mobile device by matching the at least one measured characteristic of the at least one radio signal with the data which enables a determination of characteristics of signals that are expected to be observable at different locations.

The program codes in memory 202—as far as provided for the third aspect—and memory 322 can also be viewed as comprising such means in the form of functional modules.

FIGS. 4, 5, 7, 9 and 10 may also be understood to represent example functional blocks of computer program codes supporting a positioning of a mobile device by the mobile device.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

The invention claimed is:

1. A method comprising:

holding available, at a positioning support device, stored radio image data which enables a determination of characteristics of radio signals transmitted by the positioning support device, wherein the characteristics of radio signals are expected to be observable at different locations; and automatically and repeatedly transmitting, by the positioning support device, the stored radio image data in one or more advertising packets in an autonomous manner without an external trigger to enable mobile devices receiving the radio image data to determine their position based on the radio image data, wherein the stored radio image data is transmitted as advertising data or using at least one advertising channel.

2. The method according to claim 1, wherein the stored radio image data is transmitted at least one of:

as advertising data in at least one air interface packet; and/or using at least one advertising channel that is provided for broadcasts.

3. A method comprising, performed by at least one apparatus:

obtaining characteristics of radio signals, the radio signals transmitted by a plurality of positioning support devices and the characteristics of radio signals measured by at least one mobile device at each of a plurality of locations, obtaining identifications of the positioning support devices and obtaining indications of the locations of measurement;

separately for each of two or more of the plurality of positioning support devices that transmitted radio signals for which characteristics were obtained, assembling based on the obtained characteristics of radio signals transmitted by a respective positioning support device, the obtained identification of the respective positioning support device and the obtained indications of the locations of measurement of-radio signals transmitted by the respective positioning support device radio image data which enables a determination of characteristics of radio signals transmitted by the respective positioning support device, wherein the characteristics of radio signals are expected to be observable at different locations; and causing each of the plurality of positioning support devices to store the radio image data assembled for the respective positioning support device as a basis for a repeated and automatic transmission of the radio image data in advertising packets by the respective positioning support device in an autonomous manner without an external trigger to enable mobile devices receiving the radio image data from at least one of the plurality of positioning support devices to determine their positions.

4. The method according to claim 3, wherein the stored radio image data is transmitted by the respective positioning support device as advertising data or using at least one advertising channel.

5. A method comprising, performed by at least one apparatus:

obtaining at least one characteristic of at least one radio signal, the at least one radio signal transmitted by at least one positioning support device and the at least one characteristic of the at least one radio signal measured by a mobile device at a particular location, and obtaining an identification of the at least one positioning support device;

extracting, from advertising packets of the radio signals transmitted by each of the at least one positioning support device and from which the at least one characteristic is measured, radio image data which enables a determination of characteristics of radio signals transmitted by the respective positioning support device that are expected to be observable at different locations; and estimating a position of the mobile device by matching the at least one measured characteristic of the at least one radio signal with the radio image data which enables a determination of characteristics of signals that are expected to be observable at different locations.

6. The method according to claim 5, wherein the radio image data is transmitted by the at least one positioning support device one of:

as advertising data; or as advertising data in at least one air interface packet; or using at least one advertising channel; or using at least one advertising channel that is provided for broadcasts.

7. An apparatus comprising at least one processor and at least one memory, wherein the at least one memory holds available radio image data which enables a determination of characteristics of radio signals transmitted by the apparatus, wherein the characteristics of radio signals are expected to be observable at different locations; and wherein the at least one memory includes computer program code, the at least one memory and the computer program code configured to, with the at least one processor, cause the apparatus at least to automatically and repeatedly transmit, in one or more advertising packets, the radio image data held available in the at least one memory in an autonomous manner without an external trigger to enable mobile devices receiving the data to determine their position based on the radio image data.

8. The apparatus according to claim 7, wherein the at least one memory and the computer program code are configured to, with the at least one processor, cause the apparatus to transmit the radio image data held available in the at least one memory at least one of:

as advertising data; and/or as advertising data in at least one air interface packet; and/or using at least one advertising channel; and/or using at least one advertising channel that is provided for broadcasts.

9. The method according to claim 8, wherein extracting the radio image data which enables the determination of characteristics of radio signals transmitted by the respective positioning support device that are expected to be observable at different locations comprises extracting the radio image data from the advertising packets transmitted by the respective positioning support device and combining the radio image data extracted from the advertising packets to form a radio image which enables the determination of characteristics of radio signals transmitted by the respective positioning support device that are expected to be observable at different locations.

10. The apparatus according to claim 7, wherein the characteristics of radio signals that are expected to be observable at different locations comprise values relating to received signal strengths of radio signals.

11. The apparatus according to claim 7, wherein the radio image data held available in the at least one memory and enabling a determination of characteristics of radio signals transmitted by the apparatus comprises one of:

data of a radio model for radio signals transmitted by the apparatus; or data of a grid based radio image; or compressed data of a grid based radio image; or selected frequency coefficients of frequency transformed data of a grid based radio image; or compressed selected frequency coefficients of frequency transformed data of a grid based radio image; or parameter values of a parametric radio model for radio signals transmitted by the apparatus; or parameter values of a path loss model for radio signals transmitted by the apparatus.

12. The apparatus according to claim 7, wherein the apparatus is one of:

a chip; or a module for a positioning support device; or a positioning support device; or a Bluetooth beacon; or a Bluetooth beacon enabling Bluetooth low energy mode; or a Bluetooth low energy beacon.

13. An apparatus comprising at least one processor and at least one memory including computer program code, the at least one memory and the computer program code configured to, with the at least one processor, cause the apparatus at least to perform:

obtain characteristics of radio signals, the radio signals transmitted by a plurality of positioning support devices and the characteristics of radio signals measured by at least one mobile device at each of a plurality of locations, obtain identifications of the positioning support devices and obtain indications of the locations of measurement;

separately for each of two or more of the plurality of positioning support devices that transmitted radio signals for which characteristics were obtained, assemble based on the obtained characteristics of radio signals transmitted by a respective positioning support device, the obtained identification of the respective positioning support device and the obtained indications of the locations of measurement of radio signals transmitted by the positioning support device radio image data which enables a determination of characteristics of radio signals transmitted by the respective positioning support device, wherein the characteristics of radio signals are expected to be observable at different locations; and cause each of the plurality of positioning support devices to store the radio image data assembled for the respective positioning support device as a basis for a repeated and automatic transmission of the radio image data in advertising packets by the respective positioning support device in an autonomous manner without an external trigger to enable mobile devices receiving the radio image data from at least one of the plurality of positioning support devices to determine their positions.

14. The apparatus according to claim 13, wherein the stored radio image data is transmitted by the respective positioning support device as advertising data or using at least one advertising channel.

15. The apparatus according to claim 13, wherein at least one of the plurality of positioning support devices is or comprises at least one of:
- a Bluetooth beacon; and/or
- a Bluetooth beacon enabling Bluetooth low energy mode; and/or
- a Bluetooth low energy beacon.

16. The apparatus according to claim 13, wherein the observed characteristics of radio signals comprise values relating to received signal strengths of radio signals from a respective positioning support device observed at different locations.

17. The apparatus according to claim 13, wherein assembling radio image data enabling a determination of characteristics of radio signals transmitted by a respective positioning support device comprises at least one of:
- assembling data of a radio model for radio signals transmitted by the positioning support device; and/or
- assembling data of a grid based radio image; and/or
- assembling data for a grid based radio image and compressing the data of the grid based radio image; and/or
- assembling data for a grid based radio image, frequency transforming the data of the grid based radio image and selecting frequency coefficients of the frequency transformed data of the grid based radio image; and/or
- compressing selected frequency coefficients of frequency transformed data of a grid based radio image; and/or
- computing parameter values of a parametric radio model for radio signals transmitted by the positioning support device; and/or
- computing parameter values of a path loss model for radio signals transmitted by the positioning support device.

18. The apparatus according to claim 13, wherein the apparatus is one of:
- a chip; or
- a module for a server; or
- a server; or
- a module for a mobile device; or
- a mobile device.

19. An apparatus comprising at least one processor and at least one memory including computer program code, the at least one memory and the computer program code configured to, with the at least one processor, cause the apparatus at least to perform:
- obtain at least one characteristic of at least one radio signal, the at least one radio signal transmitted by at least one positioning support device and the at least one characteristic of the at least one radio signal measured by a mobile device at a particular location, and obtain an identification of the at least one positioning support device;
- extract, from advertising packets of the radio signals transmitted by each of the at least one positioning support device and from which the at least one characteristic is measured, radio image data which enables a determination of characteristics of radio signals transmitted by the respective positioning support device that are expected to be observable at different locations; and
- estimate a position of the mobile device by matching the at least one measured characteristic of the at least one radio signal with the radio image data which enables a determination of characteristics of signals that are expected to be observable at different locations.

20. The apparatus according to claim 19, wherein the at least one positioning support device is or comprises at least one of:
- a Bluetooth beacon; and/or
- a Bluetooth beacon enabling Bluetooth low energy mode; and/or
- a Bluetooth low energy beacon.

21. The apparatus according to claim 19, wherein the radio image data is transmitted by the at least one positioning support device one of:
- as advertising data; or
- as advertising data in at least one air interface packet; or
- using at least one advertising channel; or
- using at least one advertising channel that is provided for broadcasts.

22. The apparatus according to claim 19, wherein the observed characteristics of radio signals comprise a value relating to a received signal strength of a signal from the at least one positioning support device.

23. The apparatus according to claim 19, wherein the radio image data enabling a determination of characteristics of signals transmitted by a respective positioning support device that are expected to be observable at different locations comprises one of:
- data of a radio model for radio signals transmitted by the positioning support device; or
- data of a grid based radio image; or
- compressed data of a grid based radio image, the method further comprising decompressing the data of the grid based radio image; or
- selected frequency coefficients of frequency transformed data of a grid based radio image, the method further comprising applying an inverse frequency transform to the selected frequency coefficients to recover the data of the grid based radio image; or
- compressed selected frequency coefficients of frequency transformed data of a grid based radio image, the method further comprising decompressing the selected frequency coefficients and applying an inverse frequency transform to the decompressed selected frequency coefficients to recover data of the grid based radio image; or
- parameter values of a parametric radio model for signals transmitted by the positioning support device; or
- parameter values of a path loss model for signals transmitted by the positioning support device.

24. The apparatus according to claim 19, wherein the at least one memory and the computer program code are further configured to, with the at least one processor, cause the apparatus to cause a storage of data, which is based on the obtained radio image data enabling a determination of characteristics of radio signals transmitted by a positioning support device that are expected to be observable at different locations, in a memory.

25. The apparatus according to claim 19, wherein the apparatus is one of:
- a chip; or
- a module for a mobile device; or
- a mobile device.

* * * * *

UNITED STATES PATENT AND TRADEMARK OFFICE
CERTIFICATE OF CORRECTION

PATENT NO. : 10,989,787 B2
APPLICATION NO. : 15/738481
DATED : April 27, 2021
INVENTOR(S) : Khan et al.

Page 1 of 1

It is certified that error appears in the above-identified patent and that said Letters Patent is hereby corrected as shown below:

In the Claims

Column 26,
Line 39, "measurement of-radio signals" should read --measurement of radio signals--.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*